(12) United States Patent
Wu et al.

(10) Patent No.: US 8,495,232 B2
(45) Date of Patent: Jul. 23, 2013

(54) METHODS AND APPARATUS FOR SUPPORTING BROADCAST COMMUNICATIONS IN A PEER TO PEER NETWORK

(75) Inventors: Xinzhou Wu, Monmouth Junction, NJ (US); Saurabh Tavildar, Jersey City, NJ (US); Vincent D. Park, Budd Lake, NJ (US); Junyi Li, Bedminster, NJ (US); Rajiv Laroia, Far Hills, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 12/166,634

(22) Filed: Jul. 2, 2008

(65) Prior Publication Data

US 2009/0019173 A1 Jan. 15, 2009

Related U.S. Application Data

(60) Provisional application No. 60/948,968, filed on Jul. 10, 2007.

(51) Int. Cl.
*G06F 15/16* (2006.01)

(52) U.S. Cl.
USPC ............................ 709/230; 709/228; 370/235

(58) Field of Classification Search
USPC .................................... 709/230, 228; 370/235
See application file for complete search history.

(56) References Cited

U.S. PATENT DOCUMENTS

| | | |
|---|---|---|
| 5,805,822 A | 9/1998 | Long et al. |
| 5,943,322 A | 8/1999 | Mayor |
| 6,275,500 B1 | 8/2001 | Callaway |
| 6,295,284 B1 | 9/2001 | Maggenti |
| 6,363,258 B1 | 3/2002 | Schmidt |

(Continued)

FOREIGN PATENT DOCUMENTS

| | | |
|---|---|---|
| CN | 1346579 A | 4/2002 |
| CN | 1369158 A | 9/2002 |

(Continued)

OTHER PUBLICATIONS

Young C D: "USAP multiple access dynamic resource allocation for mobile multihop multichannel wireless networking" Military Communications Conference Proceedings, 1999. MILCOM 1999 IEEE 1999. Piscataway, NJ, USA, IEEE, US, vol. 1, Oct. 31, 1999, pp. 271-275, XP010369668.

"International Search Report—PCT/US08/69444 , International Search Authority—European Patent Office"—Nov. 28, 2008.

"Written Opinion—PCT/US08/69444, International Search Authority—European Patent Office"—Nov. 28, 2008.

(Continued)

*Primary Examiner* — Alina N. Boutah
(74) *Attorney, Agent, or Firm* — James K. O'Hare

(57) ABSTRACT

Methods and apparatus related to broadcasting data in a peer to peer wireless communications network are described. A timing structure is utilized employing slots of a first type which support broadcast traffic transmissions and unicast traffic transmissions and slots of a second type which support unicast traffic transmission but do not support broadcast traffic transmissions. In various embodiments, traffic air link resource scheduling is performed in a decentralized manner on a slot by slot basis. In some such embodiments, a wireless device prior to transmitting a broadcast data traffic signal, transmits a broadcast transmission request signal, sometimes alternatively referred to as a broadcast indicator signal; and a wireless device prior to transmitting a peer to peer unicast signal, transmits a peer to peer traffic transmission request signal. In various embodiments, for slots of the first type, broadcast transmission requests have priority over peer to peer unicast transmission requests.

29 Claims, 11 Drawing Sheets

U.S. PATENT DOCUMENTS

| | | |
|---|---|---|
| 6,606,341 B1 | 8/2003 | Kanterakis et al. |
| 6,665,311 B2 * | 12/2003 | Kondylis et al. ............... 370/462 |
| 6,683,865 B1 | 1/2004 | Garcia-Luna-Aceves et al. |
| 6,829,486 B2 | 12/2004 | McKenna et al. |
| 6,912,212 B1 | 6/2005 | Young |
| 6,954,641 B2 | 10/2005 | McKenna et al. |
| 7,047,009 B2 | 5/2006 | Laroia et al. |
| 7,075,890 B2 * | 7/2006 | Ozer et al. .................... 370/230 |
| 7,110,366 B2 | 9/2006 | Hulyalkar et al. |
| 7,197,016 B2 | 3/2007 | Belcea |
| 7,263,377 B1 | 8/2007 | Wahlstrom et al. |
| 7,392,299 B2 * | 6/2008 | Maekawa ..................... 709/220 |
| 7,463,886 B2 * | 12/2008 | Salokannel et al. ........ 455/426.1 |
| 7,478,120 B1 | 1/2009 | Zhang |
| 7,532,627 B2 | 5/2009 | Chapman et al. |
| 7,539,507 B2 | 5/2009 | Grob et al. |
| 7,586,907 B2 | 9/2009 | Kubler et al. |
| 7,639,709 B1 * | 12/2009 | Amis et al. .................... 370/462 |
| 7,653,003 B2 | 1/2010 | Stine |
| 7,778,170 B2 | 8/2010 | Aboba et al. |
| 7,818,023 B2 | 10/2010 | Li et al. |
| 7,826,863 B2 | 11/2010 | Wu et al. |
| 7,961,698 B2 | 6/2011 | Wu et al. |
| 8,005,061 B2 | 8/2011 | Abdel-Kader et al. |
| 8,126,001 B2 | 2/2012 | Hwang et al. |
| 2001/0031634 A1 | 10/2001 | Mizutani et al. |
| 2002/0010937 A1 * | 1/2002 | Hirai et al. ...................... 725/91 |
| 2002/0083203 A1 | 6/2002 | Lim |
| 2002/0183064 A1 | 12/2002 | Gopalakrishnan et al. |
| 2003/0012149 A1 | 1/2003 | Maggenti et al. |
| 2003/0067906 A1 * | 4/2003 | Young ............................ 370/347 |
| 2003/0081576 A1 | 5/2003 | Kim et al. |
| 2003/0145093 A1 | 7/2003 | Oren et al. |
| 2003/0147108 A1 | 8/2003 | Gonzalez et al. |
| 2003/0227934 A1 * | 12/2003 | White et al. .................. 370/432 |
| 2004/0038707 A1 | 2/2004 | Kim |
| 2004/0073933 A1 * | 4/2004 | Gollnick et al. ................ 725/81 |
| 2004/0141525 A1 | 7/2004 | Bhushan et al. |
| 2004/0153511 A1 | 8/2004 | Maynard et al. |
| 2004/0166869 A1 | 8/2004 | Laroia et al. |
| 2004/0166887 A1 | 8/2004 | Laroia et al. |
| 2004/0228320 A1 | 11/2004 | Laroia et al. |
| 2005/0021617 A1 | 1/2005 | Rusitschka |
| 2005/0036441 A1 | 2/2005 | Laroia et al. |
| 2005/0058137 A1 * | 3/2005 | Carlson et al. .............. 370/395.4 |
| 2005/0118946 A1 * | 6/2005 | Colban et al. ................ 455/3.06 |
| 2005/0149841 A1 | 7/2005 | Kyung et al. |
| 2005/0220052 A1 | 10/2005 | Uehara et al. |
| 2005/0220131 A1 | 10/2005 | Ginzburg et al. |
| 2005/0243751 A1 | 11/2005 | Yoon et al. |
| 2005/0254419 A1 * | 11/2005 | Barker et al. .................. 370/229 |
| 2005/0259617 A1 * | 11/2005 | Wason et al. ................... 370/329 |
| 2006/0067206 A1 * | 3/2006 | Mantravadi et al. .......... 370/208 |
| 2006/0072457 A1 * | 4/2006 | Noble ............................ 370/230 |
| 2006/0092288 A1 | 5/2006 | Hara et al. |
| 2006/0092881 A1 | 5/2006 | Laroia et al. |
| 2006/0098569 A1 | 5/2006 | Han et al. |
| 2006/0107166 A1 | 5/2006 | Nanda |
| 2006/0159041 A1 * | 7/2006 | Zhun ............................... 370/328 |
| 2006/0159079 A1 | 7/2006 | Sachs et al. |
| 2006/0203713 A1 | 9/2006 | Laroia et al. |
| 2006/0215611 A1 | 9/2006 | Nakagawa et al. |
| 2006/0218222 A1 | 9/2006 | Brahmbhatt et al. |
| 2006/0223520 A1 | 10/2006 | Laroia et al. |
| 2006/0230111 A1 | 10/2006 | Andersen et al. |
| 2006/0240766 A1 | 10/2006 | Wilde |
| 2006/0256761 A1 | 11/2006 | Meylan et al. |
| 2006/0269005 A1 | 11/2006 | Laroia et al. |
| 2006/0291410 A1 | 12/2006 | Herrmann |
| 2007/0002859 A1 | 1/2007 | Corson et al. |
| 2007/0019717 A1 | 1/2007 | Laroia et al. |
| 2007/0054625 A1 * | 3/2007 | Beale .............................. 455/69 |
| 2007/0073842 A1 | 3/2007 | Uehara |
| 2007/0076807 A1 | 4/2007 | Jin et al. |
| 2007/0143458 A1 | 6/2007 | Milligan et al. |
| 2007/0149126 A1 | 6/2007 | Rangan et al. |
| 2007/0160046 A1 | 7/2007 | Matta |
| 2007/0204321 A1 * | 8/2007 | Shen et al. .................... 725/135 |
| 2007/0211686 A1 | 9/2007 | Belcea et al. |
| 2008/0005114 A1 | 1/2008 | Li |
| 2008/0013500 A1 | 1/2008 | Laroia et al. |
| 2008/0043634 A1 | 2/2008 | Wang et al. |
| 2008/0043879 A1 | 2/2008 | Gorokhov et al. |
| 2008/0069071 A1 * | 3/2008 | Tang ............................. 370/342 |
| 2008/0080530 A1 | 4/2008 | Kaler |
| 2008/0112334 A1 | 5/2008 | Laroia et al. |
| 2008/0214196 A1 | 9/2008 | Sambhwani et al. |
| 2008/0260073 A1 | 10/2008 | Jin et al. |
| 2008/0268855 A1 * | 10/2008 | Hanuni et al. ................. 455/445 |
| 2008/0301246 A1 | 12/2008 | Gkantsidis et al. |
| 2008/0311855 A1 | 12/2008 | Manousakis et al. |
| 2008/0316966 A1 * | 12/2008 | Joshi et al. .................... 370/330 |
| 2009/0003342 A1 | 1/2009 | Dickens et al. |
| 2009/0011785 A1 | 1/2009 | Celebi et al. |
| 2009/0013232 A1 | 1/2009 | Wan et al. |
| 2009/0016311 A1 | 1/2009 | Wu et al. |
| 2009/0016317 A1 | 1/2009 | Wu et al. |
| 2009/0019113 A1 | 1/2009 | Wu et al. |
| 2009/0019169 A1 | 1/2009 | Li et al. |
| 2009/0028258 A1 * | 1/2009 | Ma et al. ....................... 375/260 |
| 2009/0122810 A9 | 5/2009 | Jin et al. |
| 2009/0198825 A1 | 8/2009 | Miller et al. |
| 2009/0240833 A1 | 9/2009 | Zhang |
| 2009/0296591 A1 | 12/2009 | Urabe et al. |
| 2010/0020816 A1 | 1/2010 | Gulati et al. |
| 2010/0050001 A1 | 2/2010 | Grob et al. |
| 2011/0026404 A1 * | 2/2011 | Rappaport .................... 370/235 |
| 2011/0228691 A1 | 9/2011 | Wu et al. |

FOREIGN PATENT DOCUMENTS

| | | |
|---|---|---|
| EP | 1257140 | 11/2002 |
| EP | 1619832 | 1/2006 |
| JP | 02534869 A | 10/2002 |
| JP | 2003046482 A | 2/2003 |
| JP | 2003511925 A | 3/2003 |
| JP | 2003524941 A | 8/2003 |
| JP | 2004260422 | 9/2004 |
| JP | 2005318634 A | 11/2005 |
| JP | 2006101400 A | 4/2006 |
| JP | 2006238505 | 9/2006 |
| JP | 2006304294 A | 11/2006 |
| JP | 2006528869 A | 12/2006 |
| JP | 2007013649 | 1/2007 |
| JP | 2007520968 A | 7/2007 |
| KR | 20010093219 | 10/2001 |
| KR | 20010112410 | 12/2001 |
| KR | 20040065284 | 7/2004 |
| KR | 20050100358 A | 10/2005 |
| TW | 533706 | 5/2003 |
| TW | 200625855 | 7/2006 |
| WO | 0030374 | 5/2000 |
| WO | 0040045 | 7/2000 |
| WO | 0041543 | 7/2000 |
| WO | WO0126397 A1 | 4/2001 |
| WO | 02087204 | 10/2002 |
| WO | 03105353 | 12/2003 |
| WO | 2004053940 | 6/2004 |
| WO | 05011211 | 2/2005 |
| WO | 2005013590 A1 | 2/2005 |
| WO | 2005025148 | 3/2005 |
| WO | WO05076544 | 8/2005 |
| WO | 2006034819 A1 | 4/2006 |
| WO | 2006075277 | 7/2006 |
| WO | 2006088301 A1 | 8/2006 |
| WO | WO2006102746 A1 | 10/2006 |
| WO | WO2006132328 A1 | 12/2006 |
| WO | WO2006134472 A2 | 12/2006 |
| WO | WO2007061014 A1 | 5/2007 |

OTHER PUBLICATIONS

International Search Report and Written Opinion—PCT/US08/069689, International.
Search Authority—European Patent Office—Dec. 23, 2008.
Taiwan Search Report—TW097126144—Tipo—Feb. 17, 2012.

\* cited by examiner

METHODS AND APPARATUS FOR SUPPORTING BROADCAST COMMUNICATIONS IN A PEER TO PEER NETWORK

RELATED APPLICATIONS

The present application claims the benefit of U.S. Provisional Patent Application Ser. No. 60/948,968 filed on Jul. 10, 2007, titled "METHODS AND APPARATUS FOR SENDING BROADCAST/MULTICAST MESSAGES IN A PEER-TO-PEER NETWORK", and assigned to the assignee hereof and which is hereby expressly incorporated by reference in its entirety.

FIELD

Various embodiments relate to wireless communications, and more particularly, to methods and apparatus related to supporting broadcast communications in a peer to peer network.

BACKGROUND

In a wireless communications system there is typically a fixed amount of air link resources available for utilization by wireless communications devices for combined control signaling and traffic signaling. In a wireless communications system lacking centralized control, e.g., an ad hoc peer to peer network, the scheduling of traffic air link resources is a challenging task.

At times a device in a peer to peer network may desire to broadcast the same data to a plurality of other devices in the network, e.g., an open ended set of devices, which may happen to be in its local vicinity at the time. Using a broadcast signaling approach can, at times, be more efficient than having to schedule and transmit the same unicast data signals to multiple devices over multiple peer to peer connections. It would be beneficial if new methods and apparatus were developed which supported broadcast communications in a peer to peer network, thus allowing the same traffic signal to be communicated efficiently to multiple other devices. Methods and apparatus that support broadcast capability in a peer to peer network and do not waste traffic air link resources when broadcasting would be beneficial.

SUMMARY

Methods and apparatus related to broadcasting data in a peer to peer wireless communications network are described. In accordance with a feature of some embodiments, a timing structure is utilized employing slots of a first type which support broadcast traffic transmissions and slots of a second type which support unicast traffic transmissions but do not support broadcast traffic transmissions. In some such embodiments, slots of the first type support both broadcast and unicast traffic transmissions. In some embodiments, there are more slots of the first type than of the second type per iteration of an implemented recurring timing structure. In various embodiments, traffic air link resource scheduling is performed in a decentralized manner on a slot by slot basis. In some such embodiments, a wireless device, prior to transmitting a broadcast data traffic signal, transmits a broadcast transmission request signal, sometimes alternatively referred to as a broadcast indicator signal; and a wireless device, prior to transmitting a peer to peer unicast signal, transmits a peer to peer unicast traffic transmission request signal. In various embodiments, for slots of the first type which support both broadcast and unicast traffic, broadcast transmission requests have priority over peer to peer unicast traffic transmission requests.

An exemplary method of operating a communications device, in accordance with some embodiments includes: determining that broadcast data is to be transmitted; identifying a broadcast transmission request resource in a recurring timing structure including transmission request intervals of a first type which support broadcast transmission requests and a second type which are limited to supporting unicast transmission requests; and transmitting a transmission request in said identified broadcast transmission request resource.

An exemplary communications device in accordance with some embodiments comprises: a broadcast determination module configured to determine if broadcast data is to be transmitted; and a broadcast resource identification module configured to identify a broadcast transmission request resource in a recurring timing structure including transmission request intervals of a first type which support broadcast transmission requests and a second type which are limited to supporting unicast transmission requests. The exemplary device further comprises: a broadcast transmission request signal generation module configured to generate a broadcast transmission request when said broadcast determination module determines that broadcast data is to be transmitted; a wireless transmitter module; and a broadcast request control module configured to control the wireless transmitter module to transmit said generated broadcast transmission request in said identified broadcast transmission request resource.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
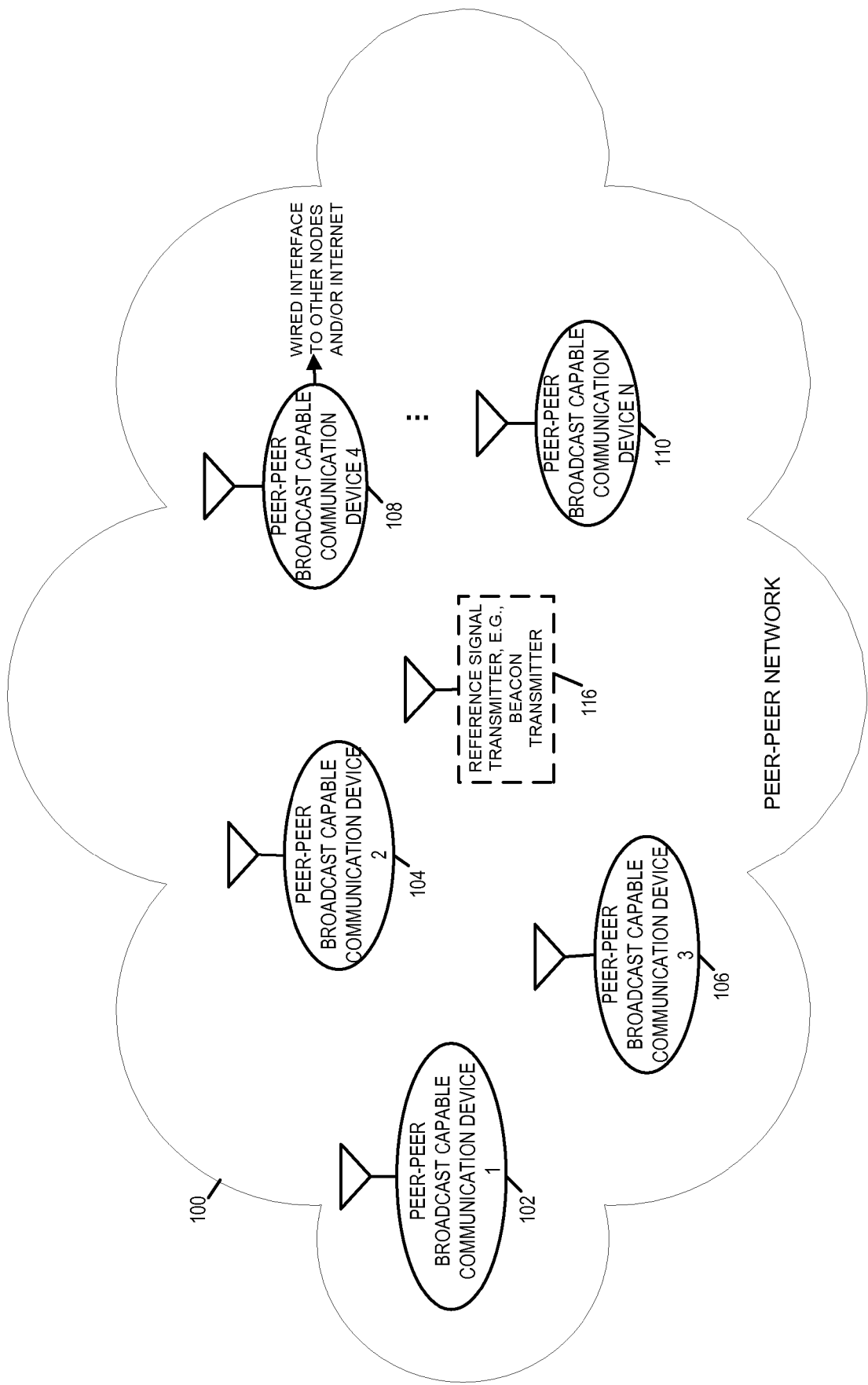
FIG. 1 is a drawing of an exemplary peer to peer network, e.g., an ad-hoc communications network supporting broadcast traffic signaling, in accordance with an exemplary embodiment.

FIG. 1 is a drawing of an exemplary peer to peer network 100, e.g., an ad-hoc communications network, in accordance with an exemplary embodiment. The exemplary network supports broadcast traffic signaling by peer to peer devices. Broadcasting includes, at least in some embodiments, multicasting and can be open in terms of the number of devices which may receive the broadcast. Broadcast differs from what is sometimes called Groupcast in that in Groupcast the transmission is to a closed group of users, e.g., where the number of listeners is often known. In the case of broadcast, the broadcasting device may, but normally does not know, the number of listeners to the broadcast.

Exemplary peer to peer network 100 includes a plurality of wireless devices (peer to peer broadcast capable communications device 1 102, peer to peer broadcast capable communications device 2 104, peer to peer broadcast capable communications device 3 106, peer to peer broadcast capable communications device 4 108, . . . , peer to peer broadcast capable communications device N 110) supporting peer to peer traffic signaling and broadcast traffic signaling. In some embodiments, the network 100 includes a reference signal transmitter 116, e.g., a beacon transmitter. In some embodiments, reference signal transmitter or another device in the network communicates network configuration control information such as information identifying a mixture between slots designated as broadcast/unicast traffic slots and slots designated as unicast slots.

The wireless devices (102, 104, 106, 108, . . . , 110) in the communications network 100 can establish connections with one another, e.g., peer to peer connections, transmit unicast peer to peer traffic signals, and transmit broadcast traffic signals. There is a recurring timing structure used in the network 100. In some embodiments a reference signal, e.g., an OFDM beacon signal from reference signal transmitter 116, is used by a wireless device to synchronize with respect to the timing structure. Alternatively, a signal used to synchronize with the timing structure may be sourced from another device, e.g., a GPS transmitter, a base station or another peer to peer device. The timing structure used in the network includes a plurality of individual traffic slots.

Figure 2:
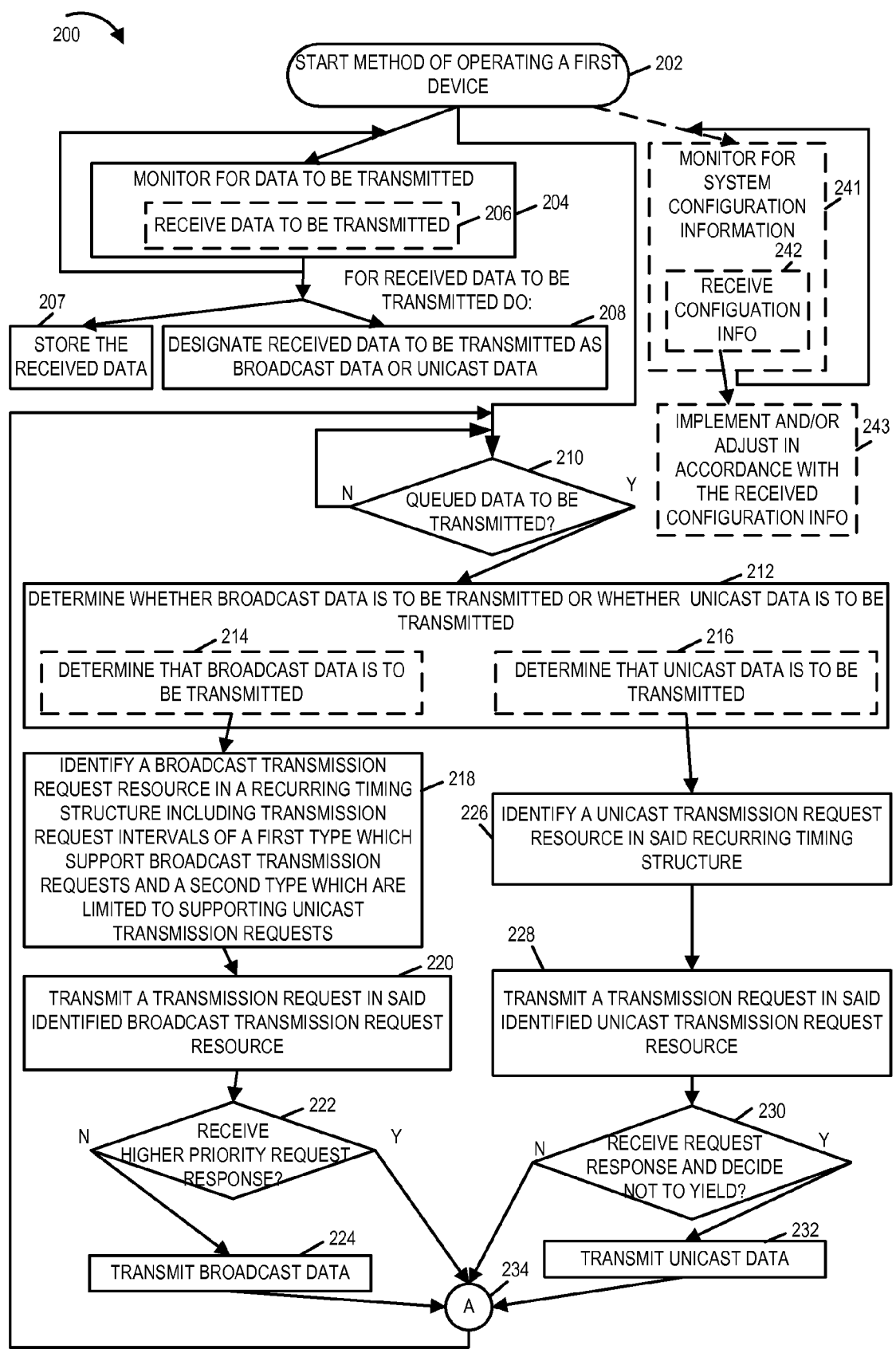
FIG. 2 is a flowchart of an exemplary method of operating a first device, e.g., a wireless communications device supporting broadcast signaling and unicast signaling.

FIG. 2 is a flowchart 200 of an exemplary method of operating a first device, e.g., a wireless communications device supporting broadcast signaling and unicast signaling. Operation starts in step 202 where the first device is powered on and initialized. Operation proceeds from start step 202 to step 204 and step 210.

In step 204, which is performed on an ongoing basis, the first device monitors for data to be transmitted. Step 204 may, and sometimes does include sub-step 206, in which the first device receives data to be transmitted, e.g., from a user I/O device. For received data to be transmitted, operation proceeds from step 204 to step 207 and step 208. In step 207 the first device stores the received data in a queue. In step 208 the first device designates the received data to be transmitted as broadcast data or unicast data.

Returning to step 210, in step 210 the first device determines if there is currently queued data waiting to be transmitted. If the determination of step 210 is that there is queued data waiting to be transmitted, then operation proceeds from step 210 to step 212; otherwise, operation proceeds from the output of step 210 to the input of step 210 for another test at a later point in time as to whether or not there is queued data waiting to be transmitted.

Returning to step 212, in step 212 the first device determines whether broadcast data is to be transmitted or whether unicast data is to transmitted. Step 212 includes sub-steps 214 and 216. At times sub-step 214 is performed in which the first device determines that broadcast data is to be transmitted. In such a situation, operation proceeds from sub-step 214 to step 218. At times, sub-step 216 is performed in which the first device determines that unicast data is to be transmitted. In such a situation, operation proceeds from sub-step 216 to step 226.

Returning to step 218, in step 218 the first device identifies a broadcast transmission request resource in a recurring timing structure including transmission request intervals of a first type which support broadcast transmission requests and a second time which are limited to supporting unicast transmission requests. In some embodiments, transmission request intervals of the first type support both broadcast and unicast transmission requests. In some embodiments, the number of second type request intervals exceeds the number of first type request intervals.

In various embodiments, the recurring timing structure includes slots dedicated to unicast transmissions and slots that support broadcast transmissions. In some such embodiments, at least some of the slots which support broadcast transmissions also support unicast transmissions. In some such embodiments, broadcast transmission request resources corresponding to a slot which supports both unicast and broadcast transmissions have a higher priority than unicast transmission request resources corresponding to that slot.

Operation proceeds from step 218 to step 220. In step 220 the first device transmits a transmission request in said identified broadcasts transmission request resource. In some embodiments, transmitting a transmission request said identified broadcast transmission request resource includes transmitting in a slot which supports broadcast transmissions. Operation proceeds from step 220 to step 222. In step 222 the first device determines whether or not it received a transmission request response, e.g., an interference control signal, in a higher priority request response resource. If it has not received a higher priority request response, then operation proceeds from step 222 to step 224 where the first device transmits broadcast data; otherwise, operation proceeds from step 222 to connecting node A 234. Operation proceeds from step 224 to connecting node A 234.

Returning to step 226, in step 226 the first device identifies a unicast transmission request resource in said recurring timing structure. Operation proceeds from step 226 to step 228, in which the first device transmits a transmission request in the identified unicast request resource which is in a transmission slot. In some embodiments, transmitting a transmission request in said identified unicast transmission request resource includes transmitting a request in a transmission slot which supports unicast transmissions. Operation proceeds from step 228 to step 230. In step 230 the first device determines if it has received a request response in response to the transmitted transmission request of step 228 and if it has decided not to yield. If the first device has received a request response and has decided not to yield, then operation proceeds from step 230 to step 232, where the first device transmits unicast data; otherwise, operation proceeds from step 230 to connecting node A 234. In some embodiments, traffic data transmission intervals in the recurring timing structure which are limited to unicast data transmission are limited to corresponding transmission request intervals of the second type.

Operation proceeds from step 232 to connecting node A 234. Operation proceeds from connecting node A 234 to step 210, where the first device checks if there is any queued data is waiting to be transmitted.

In some embodiments, the exemplary method also includes steps 241 and 243. In step 241, which in some embodiments is performed on an ongoing basis, the first device monitors for system configuration information signals, e.g., at predetermined times in a recurring timing structure. Step 241 may, and sometimes does, includes sub-step 242 in which the first device receives configuration information, e.g., information indicating a number of first type slots and second type slots in a recurring timing structure, information indicating a pattern of first type slots and second type slots in a recurring timing structure, information indicating a distribution of first type slots and second type slots in a recurring timing structure, and/or information indicating one of a plurality of alternative recurring timing structures. Operation proceeds from sub-step 242 to step 243, in which the first device implements and/or adjusts operations in accordance with the received configuration information. In some embodiments, configuration information in a region of the network can be, and sometimes is, adjusted dynamically, e.g., in response to current network conditions and/or needs. For example, the timing structure may be modified to include more or less slots supporting broadcast traffic to satisfy current conditions and/or needs. In some embodiments, the configuration information is communicated via a fixed location transmitter, e.g., a beacon transmitter.

Figure 3:
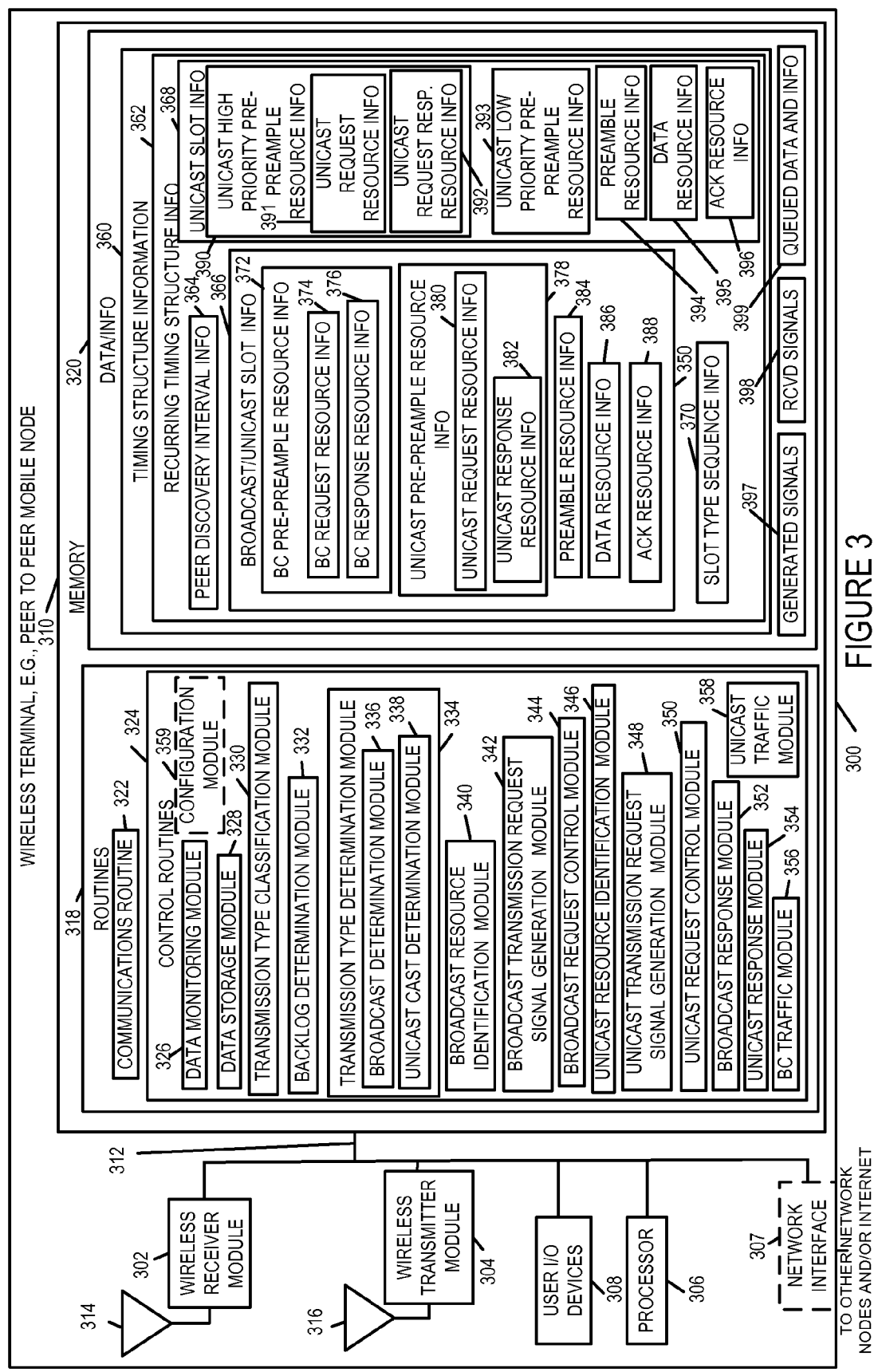
FIG. 3 is a drawing of an exemplary wireless terminal, e.g., a peer to peer mobile node supporting broadcast data signaling in accordance with an exemplary embodiment.

FIG. 3 is a drawing of an exemplary wireless terminal 300, e.g., a peer to peer mobile node, supporting broadcast data signaling in accordance with an exemplary embodiment. Exemplary wireless terminal 300 includes a wireless receiver module 302, a wireless transmitter module 304, a processor 306, user I/O devices 308 and a memory 310 coupled together via a bus 312 over which the various elements CAN exchange data and information. In some embodiments, wireless terminal 300 also includes a network interface 307 coupled to bus 312. Network interface 307 allows the wireless terminal 300 to be coupled to a backhaul network, e.g., via a wired or fiber optic link.

Memory 310 includes routines 318 and data/information 320. The processor 306, e.g., a CPU, executes the routines 318 and uses the data/information 320 in memory 310 to control the operation of the wireless terminal 300 and implement methods, e.g., the method of flowchart 200 of FIG. 2.

Wireless receiver module 302, e.g., an OFDM and/or CDMA receiver, is coupled to receive antenna 314 via which the wireless terminal 300 receives signals from other wireless devices. Received signals include, e.g., peer discovery signals, interference control signals communicated on broadcast request response air link resources, unicast transmission request response signals, channel quality information signals, and unicast traffic acknowledgment signals.

Wireless transmitter module 304, e.g., an OFDM and/or CDMA transmitter, is coupled to transmit antenna 316 via which the wireless terminal 300 transmits signals to other wireless terminals. Transmitted signals include, e.g., peer discovery signals, broadcast transmission request signals, unicast transmission request signals, pilot signals, broadcast traffic signals and unicast traffic signals. In some embodiments, the same antenna is used for receiver and transmitter.

Routines 318 include communications routine 322 and control routines 324. The communications routine 322 implements the various communications protocols used by the wireless terminal 300. Control routines 324 include a data monitoring module 326, a data storage module 328, a transmission type classification module 330, a backlog determination module 332, a transmission type determination module 334, a broadcast resource identification module 340, a broadcast transmission request signal generation module 342, a broadcast request control module 344, a unicast resource identification module 346, a unicast transmission request signal generation module 348, a unicast request control module 350, a broadcast response module 352, a unicast response module 354, a broadcast traffic module 356 and a unicast traffic module 358. Transmission type determination module 334 includes a broadcast determination module 336 and a unicast determination module 338. In some embodiments, control routines 324 includes configuration module 359.

Data/information 320 includes timing structure information 360, generated signals 397, received signals 398 and queued data and information 399. The generated signals 397 include, e.g., generated broadcast traffic transmission request signals, generated unicast traffic transmission request signals, generated pilot signals for determining a unicast traffic rate, generated broadcast traffic signals and generated unicast peer to peer traffic signals. The received signals 398 include, e.g., received interference control signals, received peer to peer traffic transmission request response signals, received channel information signals, and received unicast traffic acknowledgment signals. The queued data and information 399 includes stored data waiting to be transmitted via either broadcast traffic signals or unicast peer to peer traffic signals. The queued data and information 399 also includes information classifying the type of transmission technique to be used to transmit a portion, set, or block of stored data, e.g., broadcast or unicast.

The timing structure information 360 includes recurring timing structure information 362. The recurring timing structure information 362 includes peer discovery interval information 364, broadcast/unicast slot information 366, unicast slot information 368 and slot type sequence information 370. The broadcast/unicast slot information 366 include broadcast pre-preamble resource information 372 unicast pre-preamble resource information 378, preamble resource information 384, data resource information 386, and acknowledgment resource information 388. The broadcast pre-preamble resource information 372 includes broadcast request resource information 374 and broadcast response resource information 376. The unicast pre-preamble resource information 378 includes unicast request resource information 380 and unicast request response resource information 382.

Unicast slot information 368 inlcudes unicast high priority pre-preamble resource information 390, unicast low priority re-preamble resource information 393, preamble resource information 393, data resource information 395 and acknowledgment resource information 396. The unicast high priority pre-preamble resource information 390 includes unicast request resource information 391 and unicast request response resource information 392. Similalry, the unicast low priority pre-preamble resource information 393 includes unicast request resource information and unicast request response resource information.

Data monitoring module 326 monitors for data to be transmitted, e.g., input data obtained via user I/O devices. Data monitoring module 326, at times, receives data to be transmitted to other wireless devices. Data storage module 328 stores received data to be transmitted, e.g., in a transmission queue as part of queued data and information 399. Transmission type classification module 330 classifies and/or designates the type of transmission to be used for the queued data to be transmitted, e.g., one of broadcast and unicast. The stored data transmission type classification is stored along with the received data to be transmitted in queued data and information 399.

Backlog determination module 332 determines if there is currently queued data waiting to be transmitted. Transmission type determination module 334 determines whether broadcast data is to be transmitted or whether unicast data is to be transmitted. Broadcast determination module 336 determines if broadcast data is to be transmitted. Unicast determination module 338 determines if unicast data is to be transmitted.

Broadcast resource identification module 340 identifies a broadcast transmission request resource in a recurring timing structure including transmission request intervals of a first type which support broadcast transmission requests and a second type which are limited to supporting unicast transmission requests. For example, the first type may include the request resources of a broadcast/unicast slot, e.g. resources identified by information 374 and information 380; the second type may include the request resources of a unicast slot, e.g., resources identified by information 391 and unicast request resource information of information 393. As one example, broadcast resource identification module identifies a transmission unit within broadcast request resource information 374 associated with a broadcast device identifier currently held by wireless terminal 300.

Broadcast transmission request signal generation module 342 generates a broadcast transmission request when the broadcast determination module 336 determines that broadcast data is to be transmitted. Broadcast request control module 344 controls the wireless transmitter module 304 to the transmit the generated broadcast transmission request in the identified broadcast transmission request resource associated with the wireless terminal 300.

Unicast resource identification module 350 identifies a unicast transmission request resource in a recurring timing structure including transmission request intervals of a first type which support broadcast transmission requests and a second type which are limited to supporting unicast transmission requests. For example, unicast resource identification module 346 identifies a transmission unit within unicast request resource information 380, within unicast request resource information 391, or within unicast request resource information of information 393, associated with a connection identifier currently held by wireless terminal 300 corresponding to the peer to peer connection over which wireless terminal 300 desires to transmit the unicast traffic data.

Unicast transmission request signal generation module 348 generates a unicast transmission request when the unicast determination module 338 determines that unicast data is to be transmitted. Unicast request control module 350 controls the wireless transmitter module 304 to transmit the generated unicast transmission request in the identified unicast transmission request resource in a transmission slot which supports unicast transmissions.

Broadcast response module 352 monitors for, detects and measures received interference control signals communicated on broadcast transmission request resources, e.g., resources identified by information 376. Broadcast response module 352 makes a decision as to whether or not the wireless terminal 300 should proceed with an intended broadcast transmission or perform transmitter yielding and not transmit the intended broadcast traffic signal. In some embodiments, the broadcast response module 352 makes a decision to yield when it detects a control interference signal corresponding to a higher priority intended broadcast transmission above a threshold.

Unicast response module 354 monitors for detects, and measures received unicast transmission request response signals communicated on unicast transmission request response resources. Unicast response module 354 makes a decision whether or not wireless terminal 300 should proceed with an intended unicast traffic transmission or should perform transmitter yielding. In some embodiments the unicast response module makes a decision to continue with the intended unicast transmission if it detects a unicast request response signal corresponding to its previously transmitted unicast request response signal and does not detect any unicast request response signals corresponding to higher priority connections. If the unicast response module 354 detects a unicast request response corresponding its previously transmitted unicast transmission request and detects one or more unicast transmission request responses corresponding to higher priority connections, then module 354 makes a transmitter yielding decision as a function of the expected interference that it expects it will cause to the other higher priority connections.

Broadcast traffic module 356 generates a broadcast traffic signal, when the broadcast response module 352 decides to proceed with the intended broadcast traffic transmission. Broadcast traffic module 356 controls the wireless transmitter module 304 to the transmit the generated broadcast traffic signal in the data resource, e.g., traffic segment, corresponding to the broadcast transmission request. For example, the traffic segment used to carry the broadcast traffic signal may be identified by data resource information 386 corresponding to a broadcast transmission request conveyed in a broadcast transmission request resource identified by information 374. In this exemplary embodiment, the broadcast traffic signal is transmitted at a predetermined data rate, e.g., a low data rate such that the broadcast traffic signal may be expected to be recoverable under adverse channel conditions.

Unicast traffic module 358 generates a unicast traffic signal, when the unicast response module 354 decides to proceed with the intended unicast traffic transmission. Unicast traffic module 358 controls the wireless transmitter module 304 to the transmit the generated unicst traffic signal in the data resource, e.g., traffic segment, corresponding to the unicast transmission request which wireless terminal 300 previously transmitted. For example, if the unicast request was communicated using a resource identified by information 380, a data resource, e.g., traffic segment, identified by information 386 is used to carry the unicast traffic signal. Alternatively, if the unicast request was communicated using a resource identified by information 391, a data resource, e.g., traffic segment, identified by information 395 is used to carry the unicast traffic signal.

Unicast traffic module 358 also controls the data rate used for unicast data transmission. The data rate used for unicast traffic may be, and sometimes does, vary from one slot to another, e.g., as a function of channel quality feedback information communicated in response to a pilot signal. The pilot signal and the corresponding channel quality feedback information are communicated using preamble resources, e.g., resources identified by information 384 or information 394 depending upon the slot.

In this exemplary embodiments, unicast traffic acknowledgments are communicated in response to received unicast traffic signals. Unicast traffic module 354 also monitors for and detects unicast traffic acknowledgments signals after it has transmitted unicast traffic signals, e.g., using an acknowledgment resource identified by information 388 or information 396 depending upon the slot.

Wireless terminal 300 utilizes a recurring timing structure including slots of a first type supporting both broadcast and unicast signaling and slots of a second type supporting unicast signaling but not broadcast signaling. Thus a first type of slot, e.g., a broadcast/unicast slot such as that identified by information 366, includes requests interval resources to accommodate both broadcast transmission requests and unicast transmission requests. A second type of slot, e.g., a slot such as that identified by unicast slot information 368 include request interval resources accommodating unicast traffic transmission request but no request resources accommodating broadcast traffic transmission requests. In this embodiment, the number of the second type of slots exceeds the number of the first type of slots in the recurring timing structure.

In this exemplary embodiment, transmission request intervals of a first type support both broadcast and unicast transmission requests. The transmission request interval for a broadcast/unicast slot identified by information 372 includes a number of consecutive transmission request sub-intervals which may be non-contiguous, e.g., separated by response intervals. For example, a first transmission request sub-interval may corresponding to broadcast request resource information 374 and a second sub-interval may correspond to unicast request resource information 382.

In this exemplary embodiment, the transmission request intervals of the second type are limited to supporting unicast transmission requests. The transmission request interval for a unicast slot identified by information 368 includes a number of consecutive transmission request sub-intervals which may be non-contiguous, e.g., separated by response intervals, which support unicast transmission requests but do not support broadcast transmission request.

The number of second type transmission requests intervals exceeds the number of first type transmission request intervals in the recurring timing structure. Slot type sequence information 370 includes information identifying the sequence and number of broadcast/unicast slots and the sequence and number of unicast slots in the recurring timing structure.

In this exemplary embodiment, data transmission intervals which are limited to unicast data transmission are limited to corresponding transmission request intervals of the second type. For example, a data transmission interval identified by data resource information 395 is limited to corresponding transmission request intervals of the second type.

It may be observed that the recurring timing structure identified by information 362 includes slots dedicated to unicast transmission and slots that support broadcast transmissions. At least some of the slots which support broadcast transmissions also support unicast transmissions, e.g., a slot identified by information 366 supports both broadcast and unicast transmissions.

In this exemplary embodiment, transmission request resources corresponding to broadcast transmissions in a slot which supports both unicast and broadest transmission have a higher priority than transmission request resources corresponding to unicast transmission for the same slot. For example, resources identified by broadcast resource information 374 have higher priority than resources identified by unicast request resource information 382.

Configuration module 359 detects configuration signals, e.g., from a beacon transmitter or other device communicating system information, and implements a configuration in accordance with the information conveyed by the received configuration signals. In one embodiment, a configuration signal communications information used to set up and/or change the mixture between the number of slots designated to broadcast/unicast slots and the number of slots designated to be unicast slots in the recurring timing system being utilized in the vicinity.

Figure 4:
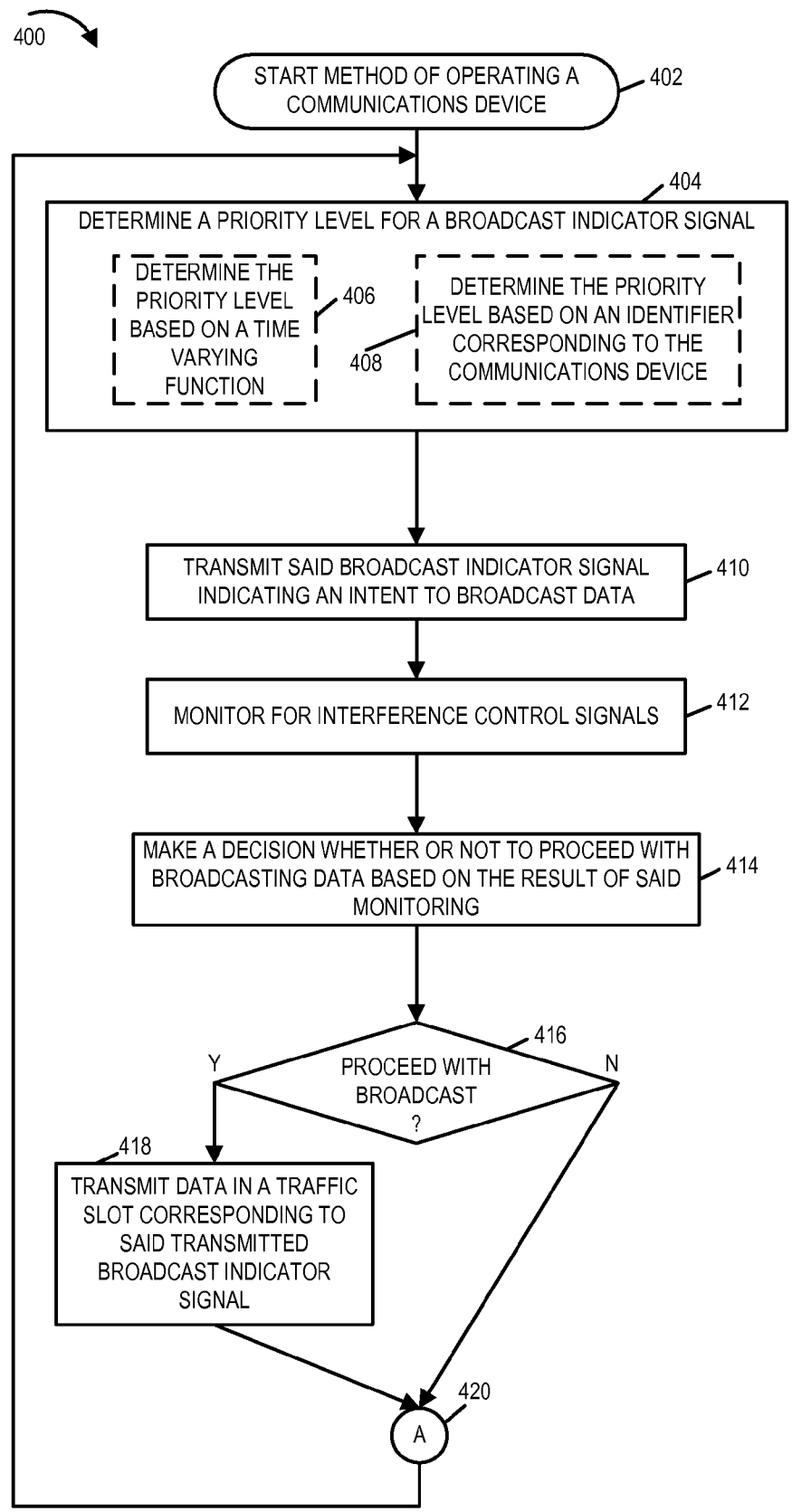
FIG. 4 is a flowchart of an exemplary method of operating a communications device in accordance with an exemplary embodiment.

FIG. 4 is a flowchart 400 of an exemplary method of operating a communications device, e.g., a peer to peer wireless terminal supporting broadcast signaling. The exemplary method starts in step 402, where the communications device is powered on and initialized. Operation proceeds from start step 402 to step 404. In step 404, the communications device determines a priority level for a broadcast indicator signal. In some embodiments step 404 includes one or more of substeps 406 and 408. In sub-step 406 the communications device determines the priority level based on a time varying function. In sub-step 408 the communications device determines the priority level based on an identifier corresponding to the communications device. Operation proceeds from step 404 to step 410.

In step 410 the communications device transmits the broadcast indicator signal indicating an intent to broadcast data. In some embodiments, the broadcast indicator signal is transmitted on a single tone of an OFDM symbol. Operation proceeds from step 410 to step 412. In step 412 the communications device monitors for interference control signals. Operation proceeds from step 412 to step 414. In step 414 the communications device makes a decision whether or not to proceed with broadcasting data based on the result of the monitoring of step 412.

In some embodiments, the broadcast indicator signal is transmitted at a determined priority level and individual interference control signals detected by the monitoring each have a priority level, and making a decision whether or not to proceed with broadcasting includes determining if an interference control signal having a higher priority than the priority level of the transmitted broadcast indicator signal was received. In some such embodiments, making a decision whether or not to proceed with broadcasting includes, when an interference control signal having a higher priority than the priority of the transmitted broadcast indicator signal was received, making an interference determination based on the power level of at least one received interference control signal having a higher priority than the priority level of the transmitted broadcast indicator signal. In some embodiments, making a decision whether or not to proceed with broadcasting includes deciding not to broadcast when the interference determination determines that an interference level above a threshold level will be caused to the device which transmitted the interference control signal having the higher priority than the priority level of the transmitted broadcast indicator signal, if the broadcast proceeds.

Operation proceeds from step 414 to step 416. In step 416, if the decision of step 414 is to proceed with the broadcast, then operation proceeds from step 416 to step 418, where the communications device transmits data in a traffic slot corresponding to the transmitted broadcast indicator signal; otherwise, operation proceeds from step 416 to connecting node A 420. Operation proceeds from step 418 to connecting node A 420. Operation proceeds from connecting node A 420 to step 404.

Consider an example, where the communications device performs two iterations of the flowchart. In a first iteration, a first broadcast indicator signal indicating an intent to broadcast data may be transmitted at a first priority level, while during a second iteration, a second broadcast signal indicating an intent to broadcast data may be transmitted at a second priority level which is different from the first priority level. In some embodiments, priority corresponding to a device identifier is varied in accordance with a hopping pattern in a recurring timing structure. This feature of variation of priority facilitates broadcast opportunities for different devices which may be in conflict due to interference issues.

Figure 5:
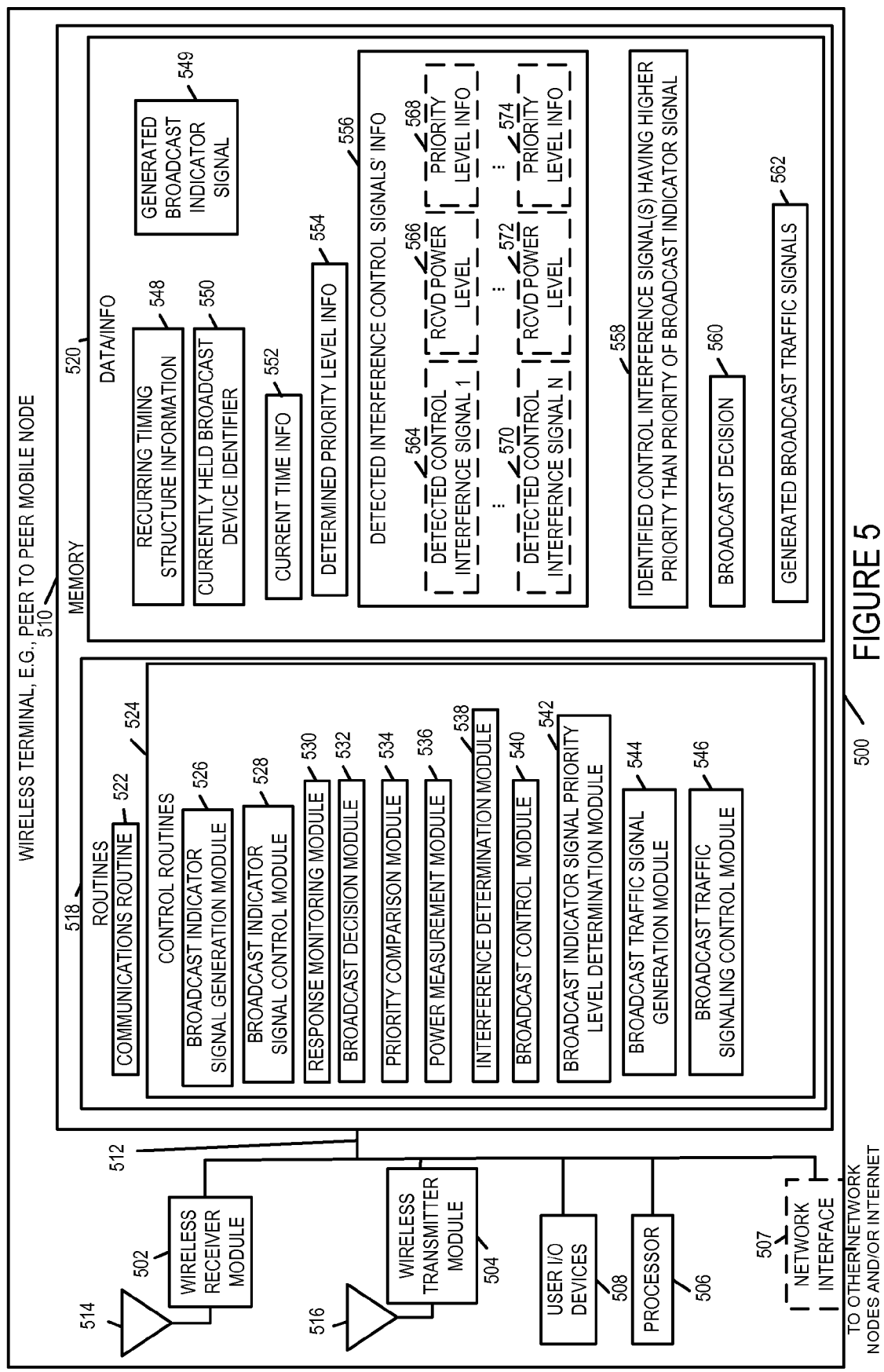
FIG. 5 is a drawing of an exemplary wireless terminal, e.g., a peer to peer mobile node supporting broadcast data signaling in accordance with an exemplary embodiment.

FIG. 5 is a drawing of an exemplary wireless terminal 500, e.g., a peer to peer mobile node 500 supporting broadcast data signaling in accordance with an exemplary embodiment. Exemplary wireless terminal 500 is, e.g., one of the communications devices of FIG. 1. Exemplary wireless terminal 500 includes a wireless receiver module 502, a wireless transmitter module 504, a processor 506, user I/O devices 508 and a memory 510 coupled together via a bus 512 over which the various elements may exchange data and information. In some embodiments, wireless terminal 500 also includes a network interface 507 coupled to bus 512. Network interface 507 allows the wireless terminal 500 to be coupled to a backhaul network, e.g., via a wired or fiber optic link.

Memory 510 includes routines 518 and data/information 520. The processor 506, e.g., a CPU, executes the routines 518 and uses the data/information 520 in memory 510 to control the operation of the wireless terminal 500 and implement methods, e.g., the method of flowchart 400 of FIG. 4.

Wireless receiver module 502, e.g., an OFDM and/or CDMA receiver, is coupled to receive antenna 514 via which the wireless terminal 500 receives signals from other wireless devices. Received signals include control interference signals.

Wireless transmitter module 504, e.g., an OFDM and/or CDMA transmitter, is coupled to transmit antenna 516 via which the wireless terminal 500 transmits signals to other wireless terminals. Transmitted signals include broadcast indicator signals and broadcast traffic signals. In some embodiments, the same antenna is used for receiver and transmitter.

Routines 518 include communications routine 522 and control routines 524. The communications routine 522 implements the various communications protocols used by the wireless terminal 500. Control routines 524 include a broadcast indicator signal generation module 526, a broadcast indicator signal control module 528, a response monitoring module 530, a broadcast decision module 532, a priority comparison module 534, a power measurement module 536, an interference determination module 538, a broadcast control module 540, a broadcast indicator signal priority level determination module 542, a broadcast traffic signal generation module 544, and a broadcast traffic signaling control module 546.

Data/information 520 includes recurring timing structure information 548, a generated broadcast indicator signal 549, information identifying a currently held broadcast device identifier 550, current time information 552, determined priority level information 554, detected interference control signals' information 556, identified control interference signal(s) having higher priority than the priority of the generated transmitted broadcast indicator signal 558, broadcast decision 560 and generated broadcast traffic signals 562. Detected interference control signals information 556 may, and sometimes does, include information corresponding to one or more detected interference control signals ((detected control interference signal 1 564, received power level information for detected control interference signal 1 566, priority level information associated with detected interference control signal 1 568), . . . , (detected control interference signal N 570, received power level information for detected control interference signal N 572, priority level information associated with detected interference control signal N 574)).

Broadcast indicator signal generation module 526 generates a broadcast indicator signal indicating an intent to broadcast data, e.g., signal 549. Broadcast indicator signal control module 528 controls the wireless transmitter module 504 to broadcast a generated broadcast indicator signal. In some embodiments, the broadcast indicator signal is transmitted on a single tone of an OFDM symbol.

Response monitoring module 530 monitors for interference control signals following transmission of a broadcast indicator signal. Broadcast decision module 532 makes a decision whether or not to proceed with broadcasting data based on the result of the monitoring. In some embodiments, an interference control signal from another wireless terminal is communicated on single tone of an OFDM symbol. In some embodiments, an interference control signal is a command from another wireless terminal not to broadcast data. In some embodiments, an interference control signal is a request from another wireless terminal not to broadcast data.

In some embodiments, the broadcast indicator signal is transmitted at a first priority level and individual interference control signals detected by the monitoring each have a priority level. In some such embodiments, priority level is associated with position of an air link resource used to carry the signal of interest, e.g., the broadcast indicator signal and/or the interference control signal, in a timing/frequency structure. Broadcast indicator signal priority level determination module 542 determines a priority level associated with a broadcast indicator signal to be transmitted by the wireless terminal based on a time varying function and/or based on an identifier corresponding to the wireless terminal. For example, wireless terminal 500 may currently hold a device identifier associated with broadcast transmission request air link resources and broadcast request response air link resources. In addition, a recurring timing structure in use, and known to wireless terminal 500, may implement a hopping sequence such that a particular device identifier to be used for broadcast has different priority levels from one slot to another in the timing structure.

Priority comparison module 534 determines if an interference control signal having a higher priority than the first priority was received, the first priority being the priority level associated with the broadcast indicator signal transmitted by wireless terminal 500. Broadcast decision module 532 makes a decision whether or not to proceed with broadcasting data as a function of the priority comparison module 534 determination.

Power measurement module 536 measures the power level of received interference control signals. Broadcast decision module 532 makes a decision whether or not to proceed with broadcasting data based on the power level of at least one received interference control signal having a higher priority than the first priority level when an interference control signal having a first priority level was detected by the response monitoring module 530.

Interference determination module 538 determines interference to other devices if the wireless terminal 500 should proceed with broadcasting data. Broadcast decision module 532 makes a decision not to broadcast data when the interference determination module 538 determines that an interference level above a threshold will be caused to the device which transmitted the interference control signal having a higher priority than the first priority level if the broadcast proceeds.

Broadcast traffic signal generation module 544 generates broadcast traffic signals, e.g., generated broadcast traffic signals 562. In some embodiments, the data rate of the broadcast traffic signals is fixed for wireless terminal 500, whereas if wireless terminal 500 were instead to transmit unicast peer to peer traffic signals using the same traffic data air link resource, e.g., traffic segment, the data rate of such a generated peer to peer unicast traffic signals could be one a plurality of different alternative data rates. In some embodiments, the transmit power level of the broadcast traffic signals is fixed for wireless terminal 500, whereas if wireless terminal 500 were instead to transmit unicast peer to peer traffic signals using the same traffic data air link resource, e.g., traffic segment, the power level of such a generated peer to peer unicast traffic signals could be one a plurality of different alternative power levels.

Broadcast traffic signaling control module 546 controls the wireless transmitter module 504 to broadcast data in a traffic slot corresponding to a transmitted broadcast indicator signal when the decision by the broadcast decision module 532 is a decision to broadcast data.

Figure 6:
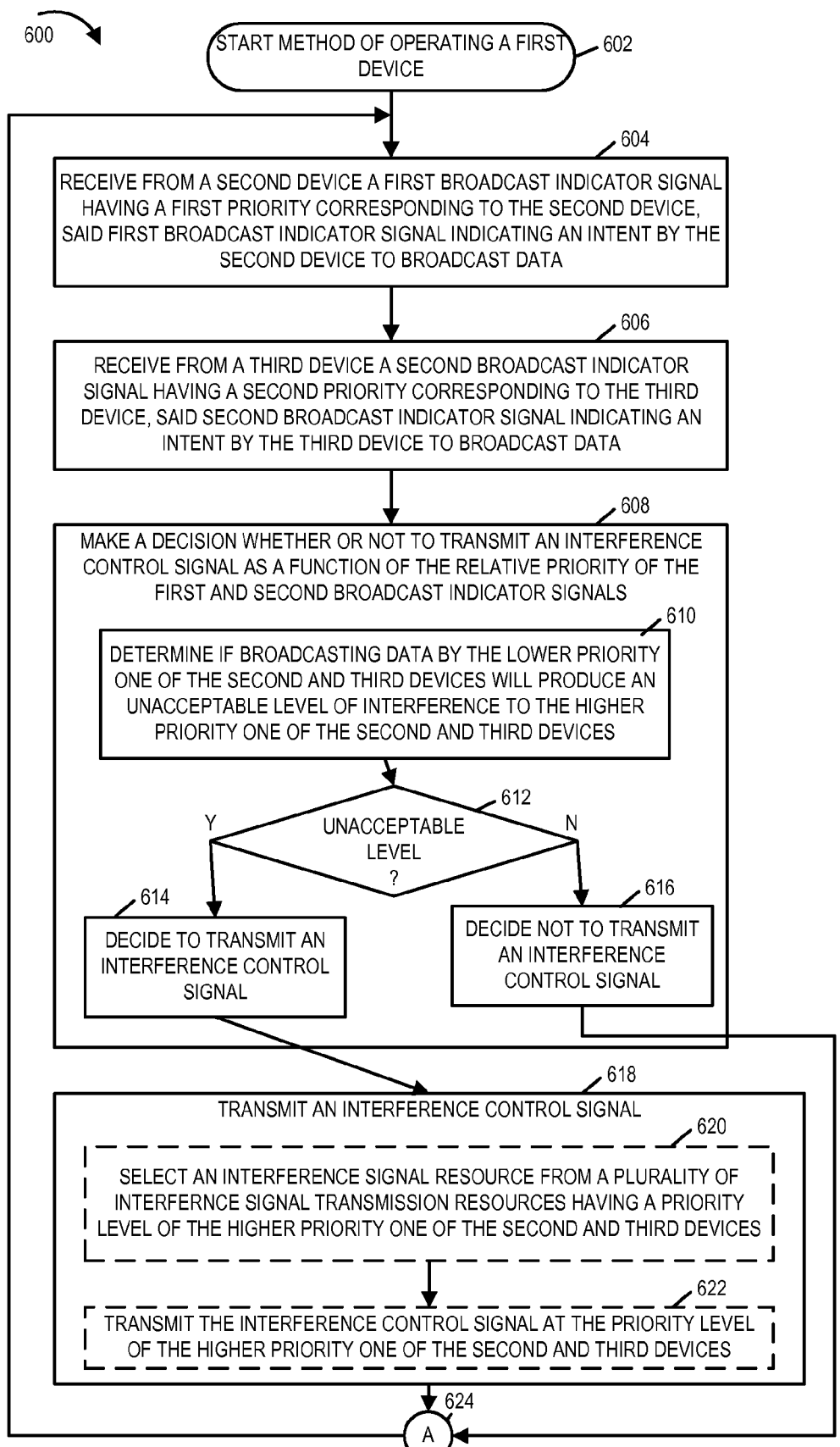
FIG. 6 is a flowchart of an exemplary method of operating a first device, e.g., a wireless communications device implementing interference control for broadcast signaling.

FIG. 6 is a flowchart 600 of an exemplary method of operating a first device, e.g., a wireless communications device supporting interference control for broadcast signaling. Operation of the exemplary method starts in step 602, where the communications device is powered on and initialized. Operation proceeds from step 602 to step 604.

In step 604 the first device receives from a second device a first broadcast indicator signal having a first priority corresponding to the second device, said first broadcast indicator signal indicating an intent by the second device to broadcast data. Operation proceeds from step 604 to step 606, in which the first device receives from the third device a second broadcast indicator signal having a second priority corresponding to the third device, said second broadcast indicator signal indicating an intent by the third device to broadcast data. In some embodiments, steps 604 and 606 may be, and sometimes are, performed in parallel, e.g., with both the first and second broadcast indicator signals being received by the first device within the same OFDM symbol transmission time interval. Operation proceeds from step 606 to step 608.

In step 608 the first device makes a decision whether or not to transmit an interference control signal as a function of the relative priority of the first and second broadcast indicator signals. Step 608 includes sub-steps 610, 612, 614 and 616. In sub-step 610 the first device determines if broadcasting data by the lower priority one of the second and third device will produce an unacceptable level of interference to the higher priority one of the second and third devices. In sub-step 612 if the determination of sub-step 610 is that the broadcasting by the lower priority one other second and third devices will produce an unacceptable level of interference, then operation proceeds from sub-step 612 to sub-step 614; otherwise, operation proceeds from sub-step 612 to sub-step 616.

Returning to sub-step 614, in sub-step 614 the first device decides to transmit an interference control signal. Operation proceeds from sub-step 614 to step 618. Returning to sub-step 616, in sub-step 616, the first device decides not to transmit an interference control signal. Operation proceeds from sub-step 616 to connecting node A 624.

Returning to step 618, in step 618 the first device transmits an interference control signal. In some embodiments, step 618 includes sub-steps 620 and 622. In sub-step 620 the first device selects and interference signal resource from a plurality of interference signal transmission resources having a priority level of the higher one of the second and third devices. Then in sub-step 622 the first device transmits the interference control signal at the priority level of the higher priority one of the second and third devices. Operation proceeds from step 618 to connecting node A 624. Operation proceeds from connecting node A 624 to step 604.

In some embodiments, the interference signal transmission resources are individual OFDM tone-symbols. In some embodiment the priorities of the second and third devices changes with time, e.g., from one slot to another.

Figure 7:
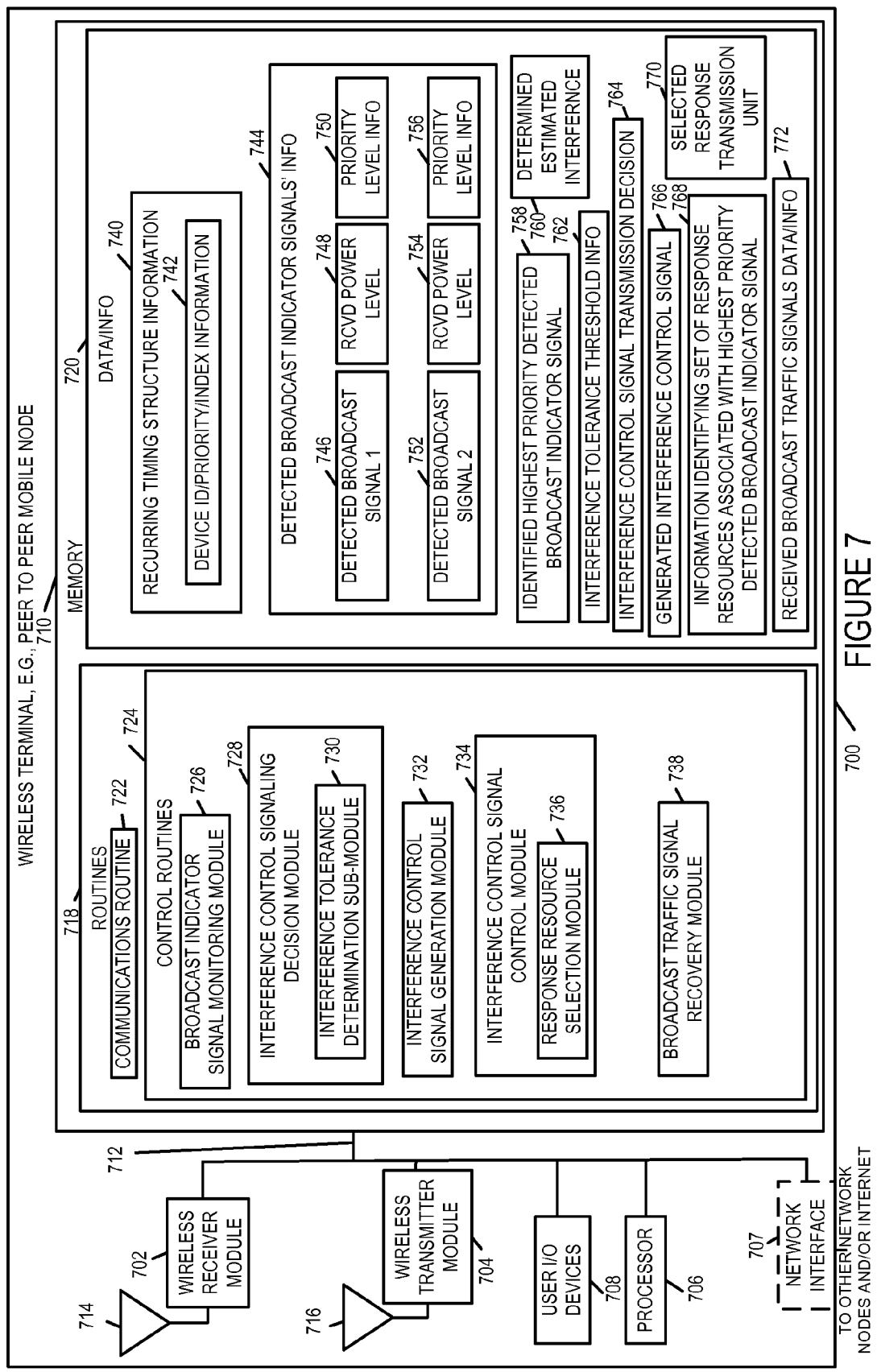
FIG. 7 is a drawing of an exemplary wireless terminal, e.g., a peer to peer mobile node supporting interference management for broadcast data signaling in accordance with an exemplary embodiment.

FIG. 7 is a drawing of an exemplary wireless terminal 700, e.g., a peer to peer mobile node 700 supporting interference management for broadcast data signaling in accordance with an exemplary embodiment. Exemplary wireless terminal 700 is, e.g., one of the communications devices of FIG. 1. Exemplary wireless terminal 700 includes a wireless receiver module 702, a wireless transmitter module 704, a processor 706, user I/O devices 708 and a memory 710 coupled together via a bus 712 over which the various elements may exchange data and information. In some embodiments, wireless terminal 700 also includes a network interface 707 coupled to bus 712. Network interface 707 allows the wireless terminal 700 to be coupled to a backhaul network, e.g., via a wired or fiber optic link.

Memory 710 includes routines 718 and data/information 720. The processor 706, e.g., a CPU, executes the routines 718 and uses the data/information 720 in memory 710 to control the operation of the wireless terminal 700 and implement methods, e.g., the method of flowchart 600 of FIG. 6.

Wireless receiver module 702, e.g., an OFDM and/or CDMA receiver, is coupled to receive antenna 714 via which the wireless terminal 700 receives signals from other wireless devices. Received signals include control broadcast indicator signals and broadcast traffic signals.

Wireless transmitter module 704, e.g., an OFDM and/or CDMA transmitter, is coupled to transmit antenna 716 via which the wireless terminal 700 transmits signals to other wireless terminals. Transmitted signals include interference control signals. In some embodiments, the same antenna is used for receiver and transmitter.

Routines 718 include communications routine 722 and control routines 724. The communications routine 722 implements the various communications protocols used by the wireless terminal 700. Control routines 724 include a broadcast indicator signal monitoring module 726, an interference control signaling decision module 728, an interference control signal generation module 732, an interference control signal control module 734, and a broadcast traffic signal recovery module 738. Interference control signaling decision module 728 includes an interference tolerance determination sub-module 730. Interference control signal control module 734 includes a response resource selection module 736.

Data/information 720 includes recurring timing structure information 740, detected broadcast indicator signals' information 744, information identifying the identified highest priority detected broadcast indicator signal 758, determined estimated interference 760, an interference tolerance threshold 762, an interference control signal transmission decision 764, a generated interference control signal 766, information identifying a set of response resources associated with the highest priority detected broadcast signal 768, a selected response transmission unit 770, and received broadcast traffic signals data/information 772. The detected broadcast signals' information 744 includes information corresponding to a plurality of detected broadcast indicator signals corresponding to the same data transmission slot (((detected broadcast signal 1

746, received power level information of detected broadcast signal 1 748, priority level information associated with detected broadcast indicator signal 1 750), (detected broadcast signal 2 752, received power level information of detected broadcast signal 2 754, priority level information associated with detected broadcast indicator signal 2 756)).

Broadcast indicator signal monitoring module 726 detects broadcast indicator signals from received signals. Broadcast indicator signal monitoring module 726 is configured to: (i) detect in received signals a first broadcast indicator signal from a second device, said first broadcast indicator signal having a first priority corresponding to the second device, said first broadcast indicator signal indicating an intent by the second device to broadcast data; and (ii) detect in received signals a second broadcast indicator signal from a third device, said second broadcast indicator signal having a second priority corresponding to the third device, said second broadcast indicator signal indicating an intent by the third device to broadcast data. For example, in the same slot in a recurring timing structure in use, both a second and third device may intend to transmit broadcast traffic signals using the same air link data resource, e.g., the same traffic segment, and each may have transmitted a broadcast indicator signal which was received and detected by the broadcast indicator signal monitoring module 726 and different priorities may be associated with the two different detected broadcast indicator signals.

Interference control signaling decision module 728 makes a decision whether or not to transmit an interference control signal as a function of the relative priority of first and second received detected broadcast indicator signals. Interference tolerance determination sub-module 730 determines if a broadcast by the lower priority one of the second and third devices will produce an unacceptable level of interference to the higher priority one of the second and third devices. In other words, interference tolerance determination sub-module 730 determines if allowing the lower priority device to broadcast data concurrently with the higher priority device is expected to unacceptably impact the successful recovery by wireless terminal 700 of the broadcast data from the higher priority device.

Interference control signal generation module 732 generates an interference control signal, e.g., signal 766. In some embodiments, the interference control signal is a signal instructing at least one lower priority device which intends to broadcast to refrain from broadcasting. In some embodiments, the interference control signal is a signal requesting at least one lower priority device which intends to broadcast to refrain from broadcasting. In various embodiments, the interference control signal is a signal communicated using a single tone of an OFDM symbol.

Interference control signal control module 734 controls the wireless transmitter module 704 to transmit a generated control interference signal when the interference control signaling decision module 728 decides to transmit an interference control signal. Interference control signaling decision module 728 decides to transmit an interference control signal when the interference tolerance determination sub-module 730 determines that the level of interference is unacceptable. The interference control signal control module 734 is configured to control the wireless transmitter module 704 to transmit a generated interference control signal at a priority level corresponding to the priority level of the higher priority one of the second and third devices, the second and third devices being the two devices from which broadcast indicator signals were detected and used for the interference tolerance determination.

Response resource selection module 736 selects an interference signaling air link resource from a plurality of interference signal transmission resources having the priority level of the higher one of the second and third devices. For example, for a given slot in the recurring structure, corresponding to each broadcast device identifier there is (i) a single broadcast transmission request resource designated to carry a broadcast indicator signal and (ii) a corresponding plurality of broadcast transmission request response resources each of which may be used to carry a interference control signal, and response resource selection module 736 makes a selection of which one of the plurality of broadcast transmission request response resources corresponding to the higher priority device to use to send the control interference signal. In some embodiments, response resource selection module 736 makes its selection pseudo-randomly. In some embodiments, the interference signal transmission resources are individual OFDM tone-symbols, where an OFDM tone-symbol is one ODFM tone for the duration of one OFDM symbol transmission time interval.

Broadcast traffic signal recovery module 738 recovers broadcast data signals and information communicated in a traffic segment, e.g., broadcast signals corresponding to the highest priority broadcast indicator signal which was detected for the slot. Note the recovery may be, and sometimes is, facilitated by transmitter yielding performed by one or more of the lower priority devices which had intended to broadcast during the same slot but which yielded in response to an interference control signal from wireless terminal 700.

Recurring timing structure information 740 includes information identifying a plurality of slots supporting broadcast transmission capability, and information identifying air link resources within those slots. Air link resources for an individual slot include air link resources designated to carry broadcast indicator signals, e.g., broadcast request resources, air link resources designated to carry interference control signals, e.g., broadcast request response resources, and resources designated to carry traffic signals which may include broadcast traffic signals, e.g., a traffic segment. Device ID/priority/index information 742 includes information which associates a particular broadcast device identifier with a particular priority for each of a plurality of slots in the recurring structure. The priority level associated with a particular broadcast device identifier can be, and sometimes is, different for at least some different slots, e.g., in accordance with a hopping sequence. In some embodiments, priority is associated with position in a resource block, e.g., position of a transmission unit in a broadcast transmission request block and/or position of a transmission unit or set of transmission units in a broadcast transmission request response block. By varying the priority associated with a broadcast device identifier over the recurring timing structure, different devices are afforded the opportunity to be allowed to broadcast where interference occurs, e.g., the same device is not continually blocked via control interference signals.

Detected broadcast indicator signals information 744 represents information corresponding to signals detected by broadcast indicator monitoring module 726. Identified highest priority detected broadcast indicator signal 758 includes information identifying one of the signals in information 744. Determined estimated interference 760 is a result of processing by interference tolerance determination sub-module 730. Interference tolerance threshold information 762 is a limit value, e.g., a predetermined stored value, used by interference tolerance determination sub-module 730, along with determined estimate interference 760 in making a determination. Interference control signal transmission decision 764 is an output of interference control signaling decision module 728 and used an input by interference control signal control module 734. Information identifying a set of response resources associated with a highest priority detected broadcast indicator signal 768 is an input of response resource selection module 736, while selected response transmission unit 770 is an output of module 736. Received broadcast traffic signals data/information 772 is an output of broadcast traffic signal recovery module 738.

It should be appreciated that, corresponding to a single broadcast indicator signal associated with a high priority broadcast device identifier, multiple receiver devices may, and sometimes do, decide that allowing a lower priority data broadcast data concurrently with a broadcast from that high priority device is unacceptable in terms of being able to recover the higher priority data broadcast. In such a situation, the multiple receiver devices, of which device 700 may be one, may each send out a control interference signal. By each receiver device selecting pseudo-randomly one transmission unit from a plurality of transmission units associated with the higher priority device for which to send its control interference signal, the likelihood of collision between two control interference signals is reduced. A collision with construction interference could result in unintended broadcasting devices deciding to refrain from transmitting. A collision with destructive interference could result in a device for which a control interference signal is intended failing to detect the signal and failing to cancel its intended broadcast transmission.

Figure 8:
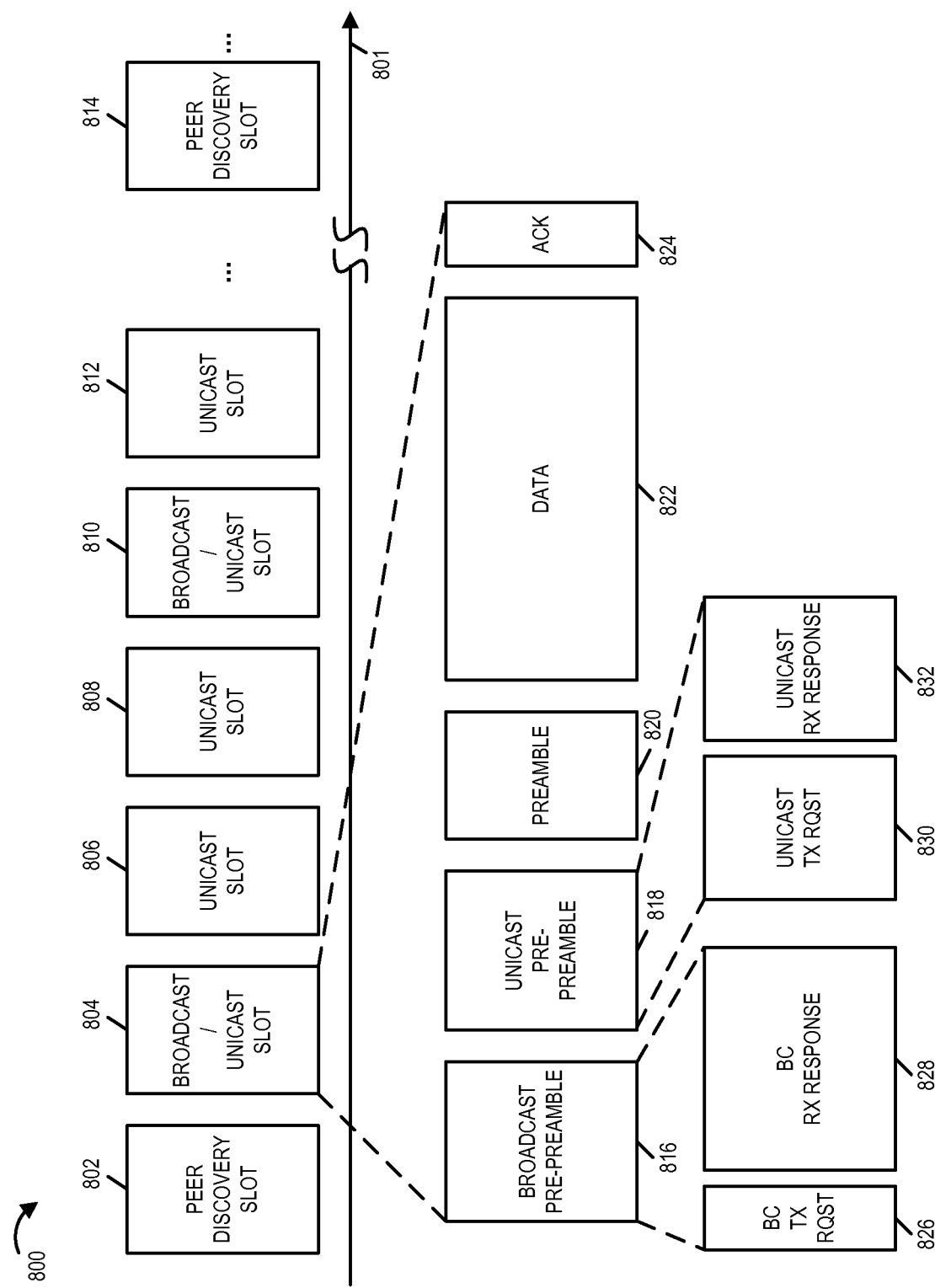
FIG. 8 is a drawing illustrating an exemplary recurring timing structure facilitating broadcast and peer to peer unicast traffic signaling used in some embodiments.

FIG. 8 is a drawing 800 illustrating an exemplary recurring timing structure used in some embodiments. The exemplary structure of FIG. 8 may be using in any of the networks of devices described with respect to FIGS. 1, 2, 3, 4, 5, 6, 7, 10 or 11. Drawing 800 illustrates time axis 801 and a plurality of slots (peer discovery slot 802, broadcast/unicast slot 804, unicast slot 806, unicast slot 808, broadcast/unicast slot 810, unicast slot 812, . . . , peer discovery slot 814, . . . ). Peer discovery slot 802 is used by wireless peer to peer devices to communicate device identifier signals with one another, establish connections with one another, and/or obtain resources associated with a connection and/or a broadcast opportunity. A broadcast/unicast slot, e.g., slot 804, is structured to support broadcast data traffic signaling and unicast data traffic signaling, e.g., peer to peer unicast data traffic signaling. A unicast slot, e.g., slot 806 is structured to support unicast data traffic signaling, e.g., peer to peer data traffic signaling. In this exemplary embodiment, there are more unicast slots than there are broadcast/unicast slots for one iteration of the recurring timing structure. In some embodiments, the periodicity of broadcast enabled slots is controlled by a system parameter. In some such embodiments, the parameter can be changed dynamically during operation to adjust the balance between broadcast/unicast slots and unicast slots to accommodate current needs.

Exemplary broadcast unicast/slot 804 includes a broadcast pre-amble air link resource portion 816, a unicast pre-amble air link resource portion 818, a preamble air link resource portion 820, a data air link resource portion 822, and an acknowledgment air link resource portion 824. Broadcast pre-amble 816 includes a broadcast transmission request air link resource portion 826, a broadcast receiver response air link resource portion 828, a unicast transmission request air link resource portion 830, and a unicast receiver transmission request response air link resource portion 832. In this example, broadcast transmission requests communicated in broadcast transmission request air link portion 826 have higher priority than unicast transmission requests communicated in unicast transmission request air link resource portion 830. The requests, whether a broadcast request or a unicast request are requests to use the corresponding data air link resource portion in the slot.

Broadcast signaling, if requested, takes precedence over unicast signaling for broadcast/unicast slot 804. However, if there is no broadcast traffic in a neighborhood, then the data air link resource portion 822 can be, and sometimes is, used to carry peer to peer unicast traffic signals.

Broadcast pre-amble 816 is used for scheduling of broadcast traffic to be communicated in data resource 822. Unicast pre-amble 818 is used for scheduling of peer to peer traffic to be communicated in data resource 822. Preamble 822 is used for rate scheduling of peer to peer traffic to be communicated using data resource 822. Preamble 818 in some embodiments, includes resources allocated to pilot signals and resources allocated to channel quality information and/or data rate information signals. Data resource 822 is used to carry broadcast traffic signals and/or peer to peer traffic signals. Acknowledgment resource 824 is used to carry traffic acknowledgments for peer to peer traffic signals when communicated.

In some embodiments, the pre-amble resource 820 and/or the acknowledgment resource 824 are not used for broadcast signaling purposes. In some embodiments, a broadcast channel is a single rate broadcast channel, e.g., with data coded at a low predetermined rate, and thus the pre-amble portion is not needed nor used to determine and set a broadcast data rate. In some embodiments, a device which intends to broadcast will send out a pilot for unicast receivers to receive and utilize in estimating interference damage. In some embodiments, such a pilot is communicated in preamble 820, while in other embodiments such a pilot may be communicated in another portion, e.g., a discovery signal from the broadcast device may be utilized.

Broadcast transmission request air link resource portion 826 is used to carry broadcast requests, sometimes alternatively referred to as broadcast indicator signals, from wireless devices. Broadcast receiver response air link resource 828 is used to carry interference control signals from receivers of the broadcast transmission request signals. Unicast transmission request air link resource 830 is used to carry peer to peer transmission request signals, while unicast receiver transmission request response air link resource 832 is used to carry transmission request response signals in response to received peer to peer transmission request signals.

In some embodiments, a different structure is utilized for the broadcast/unicast slot. For example, in another exemplary embodiment, a structure is used in which the broadcast transmission request resource is joined with the unicast transmission request resource, e.g., in one block, and then the block is followed by a request response resource block.

Figure 9:
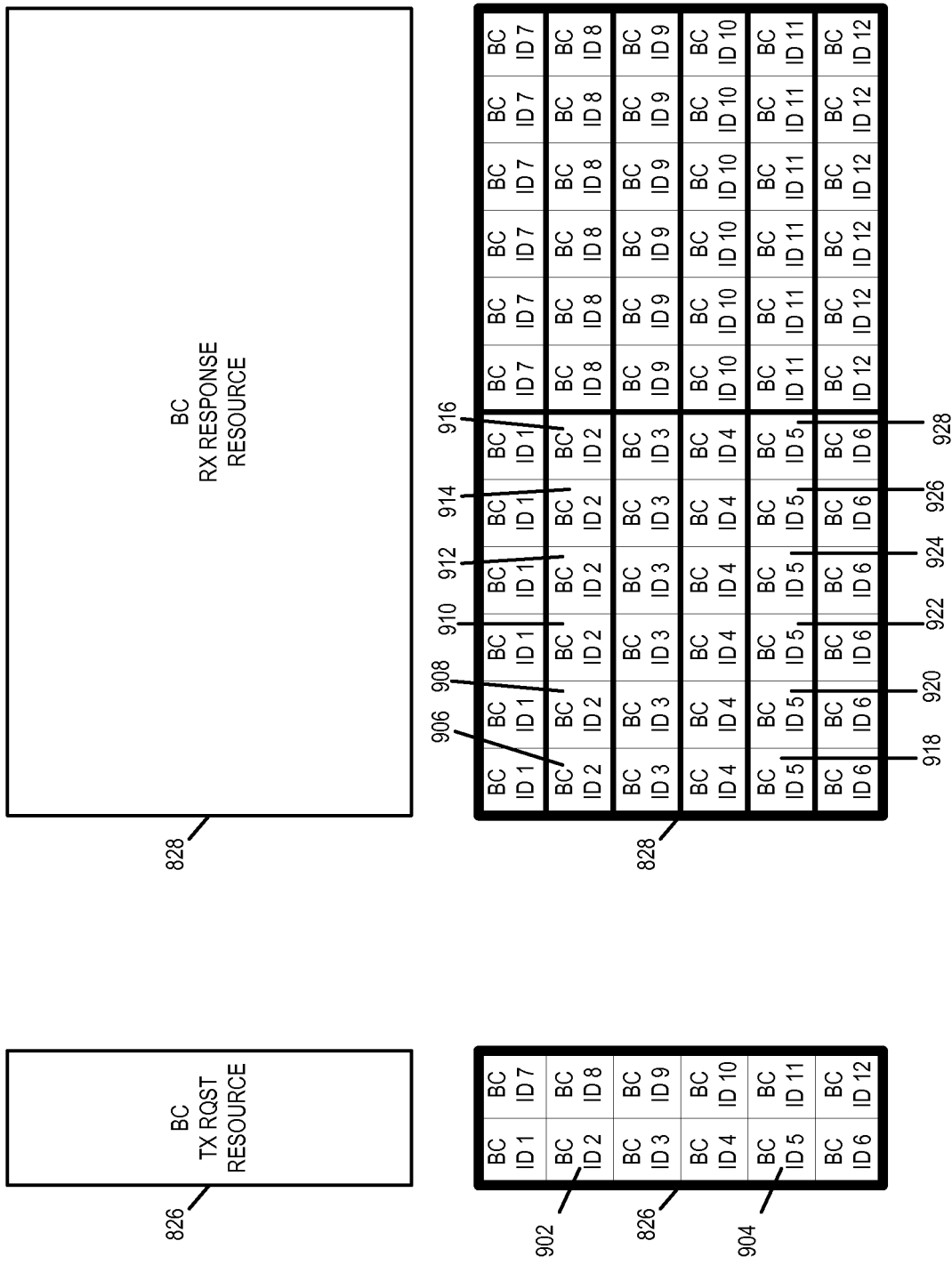
FIG. 9 illustrates exemplary broadcast transmission request air link resources of FIG. 8 and exemplary broadcast receiver response air link resources of FIG. 8 in more detail in accordance with one exemplary embodiment.

FIG. 9 illustrates exemplary broadcast transmission request air link resource 826 and exemplary broadcast receiver response air link resource 828 in more detail. In this exemplary embodiment regarding broadcasting, more resources are allocated to response resources than to request resources. Exemplary broadcast request resource 826 includes 12 individual transmission request units, each associated with a different broadcast connection identifier. For example for this particular slot, broadcast transmission request transmission unit 902 is associated with broadcast identifier 2, while broadcast transmission request unit 904 is associated with broadcast identifier 5. Each position within the broadcast transmission request air link resource 826 is associated with a priority, e.g., a different priority. In this example, transmission unit 902 has higher priority than transmission unit 904. In some embodiments, from one broadcast/unicast slot to another broadcast/unicast slot, the priority associated with a particular broadcast device identifier changes, e.g., in accordance with a hopping sequence which maps the broadcast identifier to different transmission unit location within the broadcast transmission request resources.

Broadcast receiver response resource 828 includes sets of transmission units associated with each broadcast device identifier. For example, corresponding to broadcast device identifier 2, there are six transmission units (906, 908, 910, 912, 914, 916) allocated to carry control interference signals. Similarly, corresponding to broadcast device identifier 5, there are six transmission units (918, 920, 922, 924, 926, 928) allocated to carry control interference signals. Priority is also associated with the different device identifiers within the resource 828.

Figure 10:
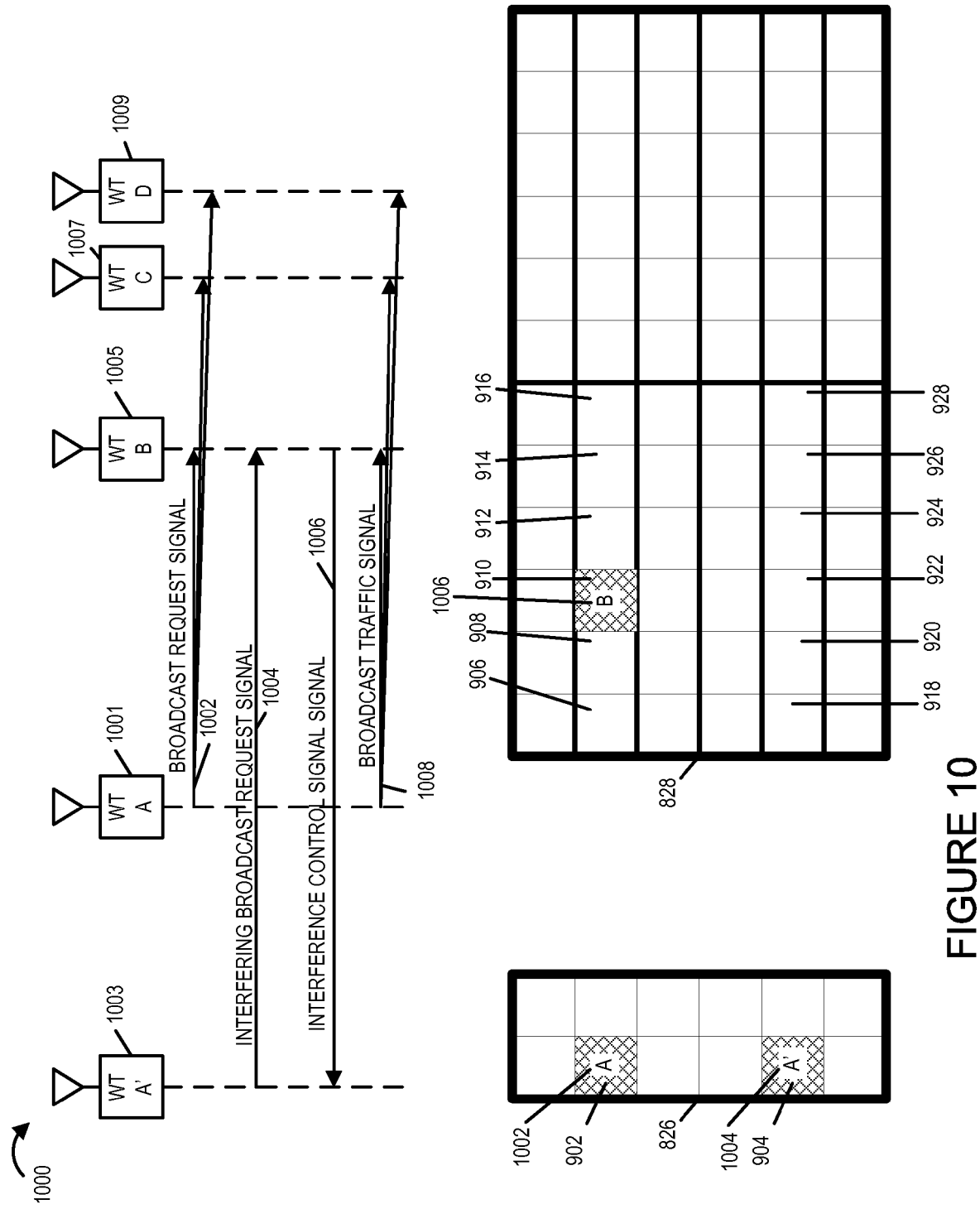
FIG. 10 includes a drawing illustrating exemplary signaling in a region of a peer to peer network which illustrates interference management of broadcast signaling in accordance with an exemplary embodiment.

FIG. 10 includes a drawing 1000 illustrating exemplary signaling in a region of a peer to peer network in accordance with an exemplary embodiment. In the example, of FIG. 10, assume that the broadcast transmission request resource 826 and the broadcast receiver response resource 828 described with respect to FIGS. 8 and 9 are utilized. In this example, WT A 1001 and WT A' 1003 want to broadcast data in the same air link data resource 822. Assume that WT A 1001 currently holds broadcast connection identifier 2 associated with broadcast request transmission unit 902 and broadcast receiver response transmission units (906, 908, 910, 912, 914, 916). Assume that WT A' 1002 currently holds broadcast connection identifier 5 associated with broadcast request transmission unit 904 and broadcast receiver response transmission units (918, 920, 922, 924, 926, 928). Assume that for this slot the broadcast request associated with connection identifier 2 has higher priority than the broadcast request associated with connection identifier 5.

WT A 1001 generates broadcast transmission request signal 1002 which is communicated using transmission unit 902. The broadcast request signal 1002 is received and recovered by WT B 1005, WT C 1007, and WT D 1009. WT A' 1003 generates broadcast transmission request signal 1004 which is received and recovered by WT B 1005. WT C 1007 and WT D 1009 are sufficiently far enough away from WT A' 1003 so that they do not detect the broadcast request signal 1004 from WT A' 1003 or detect it at such a low power level that it does not provide an interference problem with regard to receiving broadcast signals from WT A 1001.

WT B 1005 decides that it would like WT A' 1003 to refrain from broadcasting since from WT B's receiver perspective, concurrent broadcast signals from WT A' 1003 will unacceptably interfere with its reception of broadcast signals from WT A 1001 which has higher priority. Therefore, WT B 1005 selects, e.g., randomly one of the response transmission units from the set of transmission units associated with WT A (906, 908, 910, 912, 914, 916). In this case WT B 1005 selects to use transmission unit 910. WT B 1005 generates and transmits interference control signal 1006 using air link resource transmission unit 910.

WT A 1001 monitors for interference control signals on resources associated with higher priority than its own priority level. WT A 1001 does not detect any such interference control signals so it determines that it is ok to proceed with its intended broadcast.

WT A' 1003 monitors for interference control signals on resources associated with higher priority than its own priority level, and detects interference control signal 1006 on resource 910. The interference control signal 1006 is received by WT A' 1003 at a level above a threshold. Therefore, WT A' 1003 determines that it is not permitted to broadcast data, and refrains from broadcasting a traffic signal in data resource 822.

WT A 1001 transmits broadcast traffic signal 1008 in data resource 822 which is successfully received and recovered by WT B 1005, WT C 1007 and WT D 1009.

Figure 11:
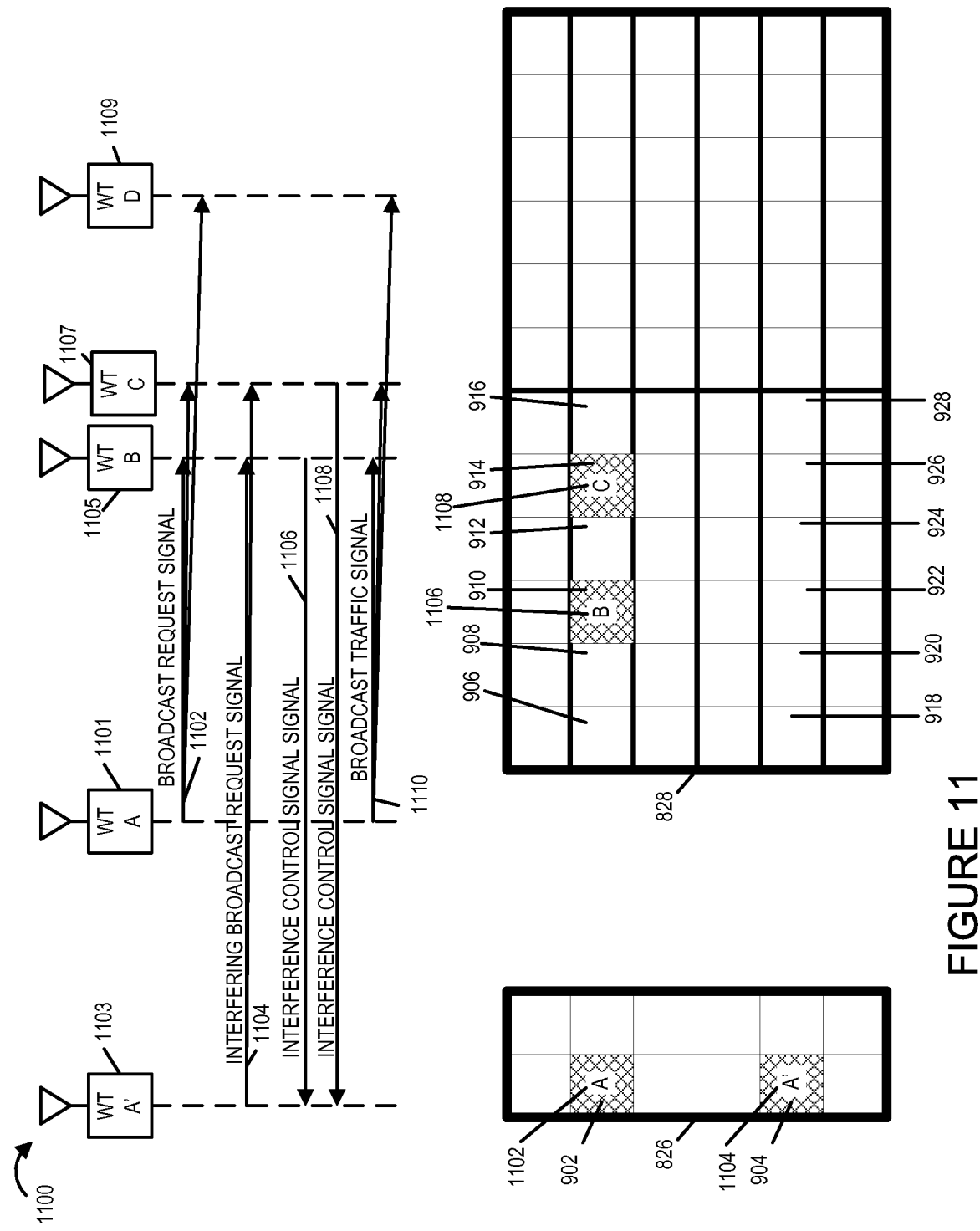
FIG. 11 includes a drawing illustrating exemplary signaling in a region of a peer to peer network which illustrates interference management of broadcast signaling in accordance with an exemplary embodiment.

FIG. 11 includes a drawing 1100 illustrating exemplary signaling in a region of a peer to peer network in accordance with an exemplary embodiment. In the example, of FIG. 11, assume that the broadcast transmission request resource 826 and the broadcast receiver response resource 828 described with respect to FIGS. 8 and 9 are utilized. In this example, WT A 1101 and WT A' 1103 want to broadcast data in the same air link data resource 822. Assume that WT A 1101 currently holds broadcast connection identifier 2 associated with broadcast request transmission unit 902 and broadcast receiver response transmission units (906, 908, 910, 912, 914, 916). Assume that WT A' 1102 currently holds broadcast connection identifier 5 associated with broadcast request transmission unit 904 and broadcast receiver response transmission units (918, 920, 922, 924, 926, 928). Assume that for this slot the broadcast request associated with connection identifier 2 has higher priority than the broadcast request associated with connection identifier 5.

WT A 1101 generates broadcast transmission request signal 1102 which is communicated using transmission unit 902. The broadcast request signal 1102 is received and recovered by WT B 1105, WT C 1107, and WT D 1109. WT A' 1103 generates broadcast transmission request signal 1104 which is received and recovered by WT B 1105 and WT C 1107. WT D 1109 is sufficiently far enough away from WT A' 1103 so that it does not detect the broadcast request signal 1104 from WT A' 1103 or detects it at such a low power level that it does not provide an interference problem with regard to receiving broadcast signals from WT A 1 101.

WT B 1105 decides that it would like WT A' 1103 to refrain from broadcasting since from WT B's receiver perspective, concurrent broadcast signals from WT A' 1103 will unacceptably interfere with its reception of broadcast signals from WT A 1101 which has higher priority. Therefore, WT B 1105 selects, e.g., randomly one of the response transmission units from the set of transmission units associated with WT A (906, 908, 910, 912, 914, 916). In this case WT B 1105 selects to use transmission unit 910. WT B 1105 generates and transmits interference control signal 1106 using air link resource transmission unit 910.

WT C 1107 decides that it would like WT A' 1103 to refrain from broadcasting since from WT C's receiver perspective, concurrent broadcast signals from WT A' 1103 will unacceptably interfere with its reception of broadcast signals from WT A 1101 which has higher priority. Therefore, WT C 1107 selects, e.g., randomly one of the response transmission units from the set of transmission units associated with WT A (906, 908, 910, 912, 914, 916). In this case WT C 1107 selects to use transmission unit 914. WT C 1107 generates and transmits interference control signal 1108 using air link resource transmission unit 914.

WT A 1101 monitors for interference control signals on resources associated with higher priority than its own priority level. WT A 1101 does not detect any such interference control signals so it determines that it is ok to proceed with its intended broadcast.

WT A' 1103 monitors for interference control signals on resources associated with higher priority than its own priority level, and detects interference control signal 1106 on resource 910 and interference control signal 1108 on resource 914. WT A' 1103 compares each of the received detected higher priority interference control signals to a threshold. In this example, at least one of the detected higher priority control signals exceeds a threshold. Therefore, WT A' 1103 decides not to broadcast data, and refrains from broadcasting a traffic signal in data resource 822.

WT A 1101 transmits broadcast traffic signal 1110 in data resource 822 which is successfully received and recovered by WT B 1105, WT C 1107 and WT D 1109.

WT A 1001, WT A' 1003, WT B 1005, WT C 1007, WT D 1009 are, e.g., wireless devices in accordance with one or more of FIGS. 3, 5, and/or 7 and/or implementing one or more of the methods of FIGS. 2, 4 and/or 6. WT A 1101, WT A' 1103, WT B 1105, WT C 1107, WT D 1109 are, e.g., wireless devices in accordance with one or more of FIGS. 3, 5, and/or 7 and/or implementing one or more of the methods of FIGS. 2, 4 and/or 6.

The techniques of various embodiments may be implemented using software, hardware and/or a combination of software and hardware. Various embodiments are directed to apparatus, e.g., mobile nodes such as mobile access terminals, base stations including one or more attachment points, and/or communications systems. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

In various embodiments nodes described herein are implemented using one or more modules to perform the steps corresponding to one or more methods, for example, determining that data is to be transmitted, identifying a broadcast transmission request resource in a recurring timing structure including transmission request intervals of a first type which support broadcast transmission requests and a second type which are limited to supporting unicast transmission requests, transmitting a transmission request resource in an identified broadcast transmission request resource, etc. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node.

The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method, comprising operating a first device to perform the steps of:
   determining that broadcast data is to be transmitted;
   identifying a broadcast transmission request resource in a recurring timing structure including transmission request intervals of a first type which support broadcast transmission requests and a second type which are limited to supporting unicast transmission requests;
   transmitting a transmission request in said identified broadcast transmission request resource;
   receiving a transmission request response in response to the transmission request, the transmission request having a first priority and the transmission request response having a second priority; and
   determining to abstain from transmitting the broadcast data when the second priority is greater than the first priority.

2. The method of claim 1, wherein said transmission request intervals of the first type support both broadcast and unicast transmission requests.

3. The method of claim 1, wherein the number of second type transmission request intervals exceeds the number of first type transmission request intervals in said recurring timing structure.

4. The method of claim 3, wherein said recurring timing structure includes unicast data transmission intervals which are limited to use in transmitting unicast data; and
wherein unicast data transmission intervals are limited to corresponding to transmission request intervals of the second type.

5. The method of claim 1, wherein said recurring timing structure includes slots dedicated to unicast transmissions and slots that support broadcast transmissions.

6. The method of claim 5, wherein at least some of the slots which support broadcast transmissions also support unicast transmissions.

7. The method of claim 6, wherein transmission request resources corresponding to broadcast transmissions in a slot which supports both unicast and broadcast transmissions have a higher priority than transmission request resources corresponding to unicast transmissions in said slot.

8. The method of claim 5, wherein transmitting a transmission request in said identified broadcast transmission request resource includes transmitting in a slot which supports broadcast transmissions.

9. The method of claim 8, further comprising:
when having unicast data to transmit, transmitting a request in a transmission slot which supports unicast transmissions.

10. The method of claim 1,
further comprising:
determining to transmit the broadcast data when the second priority is less than the first priority; and
transmitting the broadcast data when the second priority is less than the first priority.

11. The method of claim 1, wherein locations of said transmission request intervals of said first and second type are predetermined prior to performing said steps of identifying a broadcast transmission request resource and transmitting a transmission request.

12. A device comprising:
a broadcast determination module configured to determine if broadcast data is to be transmitted;
a broadcast resource identification module configured to identify a broadcast transmission request resource in a recurring timing structure including transmission request intervals of a first type which support broadcast transmission requests and a second type which are limited to supporting unicast transmission requests;
a broadcast transmission request signal generation module configured to generate a broadcast transmission request when said broadcast determination module determines that broadcast data is to be transmitted;
a wireless transmitter module;
a broadcast request control module configured to control the wireless transmitter module to transmit said generated broadcast transmission request in said identified broadcast transmission request resource; and
a broadcast response module configured to receive a transmission request response in response to the transmission request, the transmission request having a first priority and the transmission request response having a second priority, and configured to determine to abstain from transmitting the broadcast data when the second priority is greater than the first priority.

13. The device of claim 12, further comprising:
a memory including information identifying said recurring timing structure.

14. The device of claim 12, wherein said transmission request intervals of the first type support both broadcast and unicast transmission requests.

15. The device of claim 12, wherein the number of second type transmission request intervals exceeds the number of first type transmission request intervals in said recurring timing structure.

16. The device of claim 15, wherein said recurring timing structure includes unicast data transmission intervals which are limited to use in transmitting unicast data; and
wherein unicast data transmission intervals are limited to corresponding to transmission request intervals of the second type.

17. The device of claim 12, wherein said recurring timing structure includes slots dedicated to unicast transmissions and slots that support broadcast transmissions.

18. The device of claim 17, wherein at least some of the slots which support broadcast transmissions also support unicast transmissions.

19. The device of claim 18, wherein transmission request resources corresponding to broadcast transmissions in a slot which supports both unicast and broadcast transmissions have a higher priority than transmission request resources corresponding to unicast transmissions in said slot.

20. The device of claim 17, wherein transmitting a transmission request in said identified broadcast transmission request resource includes transmitting in a slot which supports broadcast transmissions.

21. The device of claim 20, further comprising:
a unicast determination module configured to determine if unicast data is to be transmitted;
a unicast transmission request signal generation module configured to generate a unicast transmission request when said unicast determination module determines that unicast data is to be transmitted; and
a unicast request control module configured to control the wireless transmitter module to transmit said generated unicast transmission request in said identified unicast transmission request resource in a transmission slot which supports unicast transmissions.

22. A device comprising:
broadcast determination means for determining if broadcast data is to be transmitted;
broadcast resource identification means for identifying a broadcast transmission request resource in a recurring timing structure including transmission request intervals of a first type which support broadcast transmission requests and a second type which are limited to supporting unicast transmission requests;
broadcast transmission request signal generation means for generating a broadcast transmission request when said broadcast determination means determines that broadcast data is to be transmitted;
a wireless transmitter means; and
broadcast request control means for controlling the wireless transmitter means to transmit said generated broadcast transmission request in said identified broadcast transmission request resource;
broadcast response means for receiving a transmission request response in response to the transmission request, the transmission request having a first priority and the transmission request response having a second priority, and for determining to abstain from transmitting the broadcast data when the second priority is greater than the first priority.

23. The device of claim 22, further comprising:
memory means including information identifying said recurring timing structure.

24. The device of claim 22, wherein said transmission request intervals of the first type support both broadcast and unicast transmission requests.

25. The device of claim 22, wherein the number of second type transmission request intervals exceeds the number of first type transmission request intervals in said recurring timing structure.

26. The device of claim 25, wherein said recurring timing structure includes unicast data transmission intervals which are limited to use in transmitting unicast data; and
wherein unicast data transmission intervals are limited to corresponding to transmission request intervals of the second type.

27. A computer program product, the computer program product comprising:
non-transitory computer readable medium comprising:
code for causing a computer to determine that broadcast data is to be transmitted;
code for causing a computer to identify a broadcast transmission request resource in a recurring timing structure including transmission request intervals of a first type which support broadcast transmission requests and a second type which are limited to supporting unicast transmission requests;
code for causing a computer to control transmitting a transmission request in said identified broadcast transmission request resource;
code for causing a computer to receive a transmission request response in response to the transmission request, the transmission request having a first priority and the transmission request response having a second priority; and
code for causing a computer to determine to abstain from transmitting the broadcast data when the second priority is greater than the first priority.

28. The computer program product of claim 27, wherein said transmission request intervals of the first type support both broadcast and unicast transmission requests.

29. The computer program product of claim 27, wherein the number of second type transmission request intervals exceeds the number of first type transmission request intervals in said recurring timing structure.

* * * * *